July 12, 1966   S. E. BERGSTROM ETAL   3,259,976
AUTOMATIC TOOL CHANGE MECHANISM FOR MACHINE TOOL
Filed Sept. 25, 1963   16 Sheets-Sheet 2

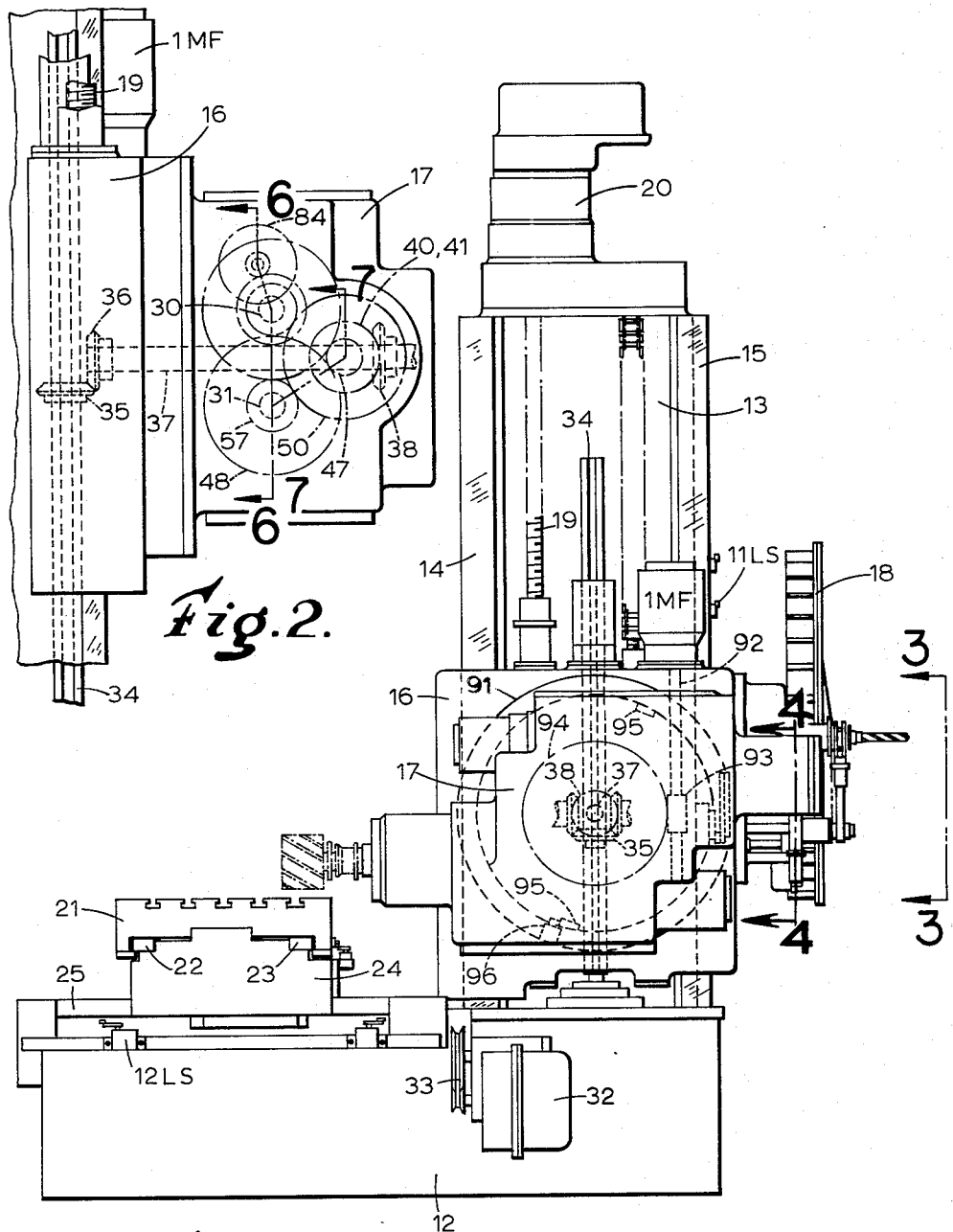

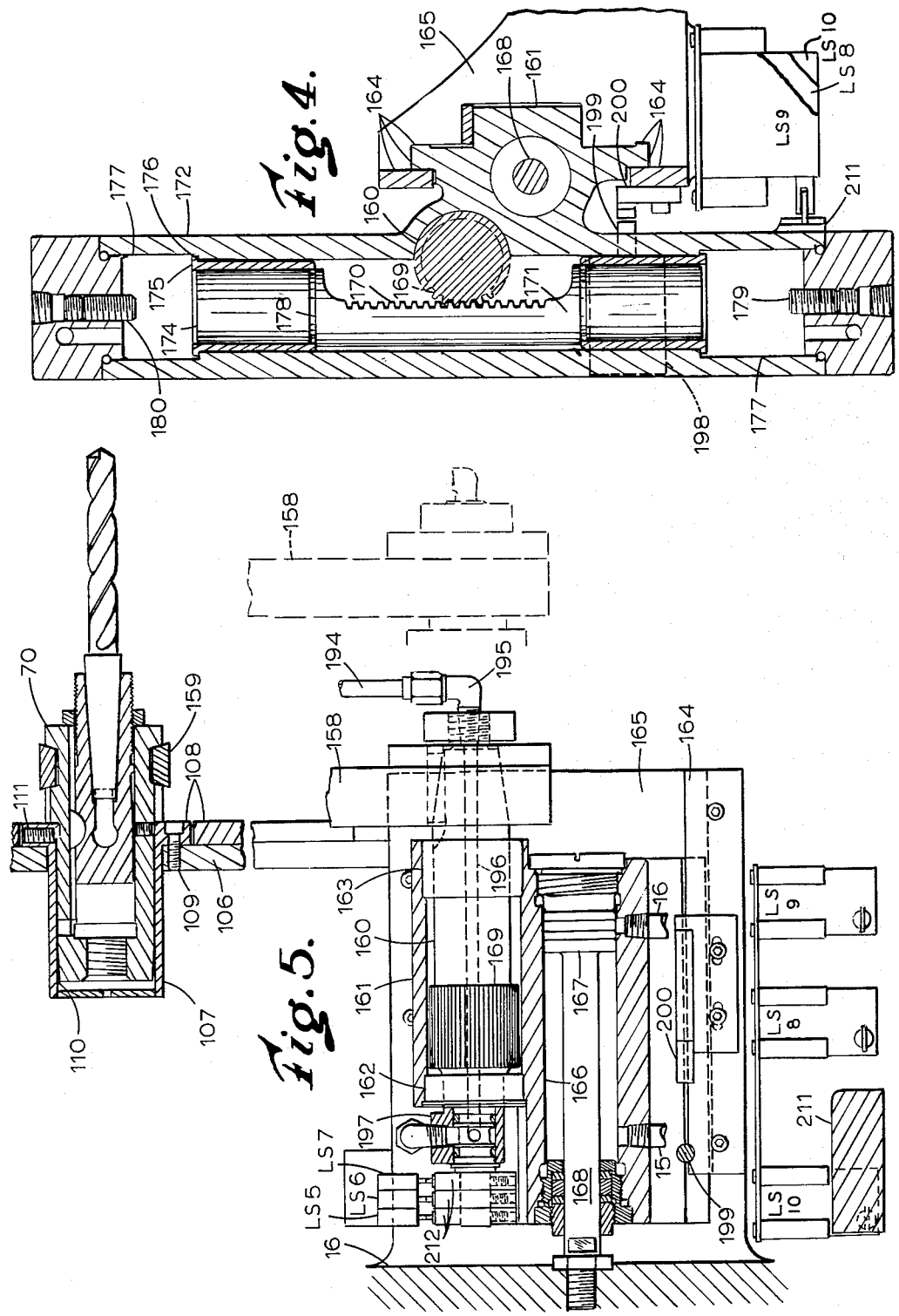

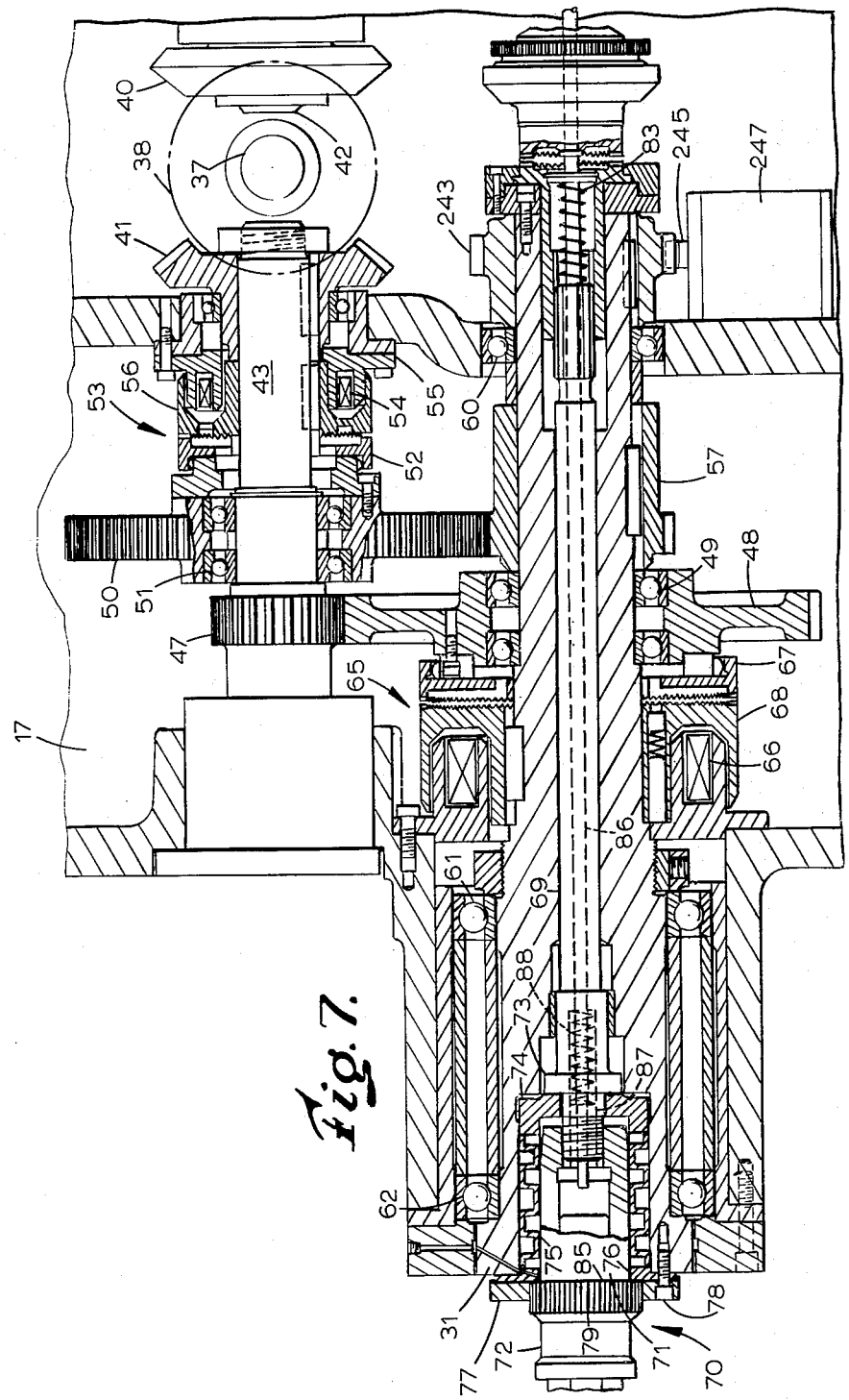

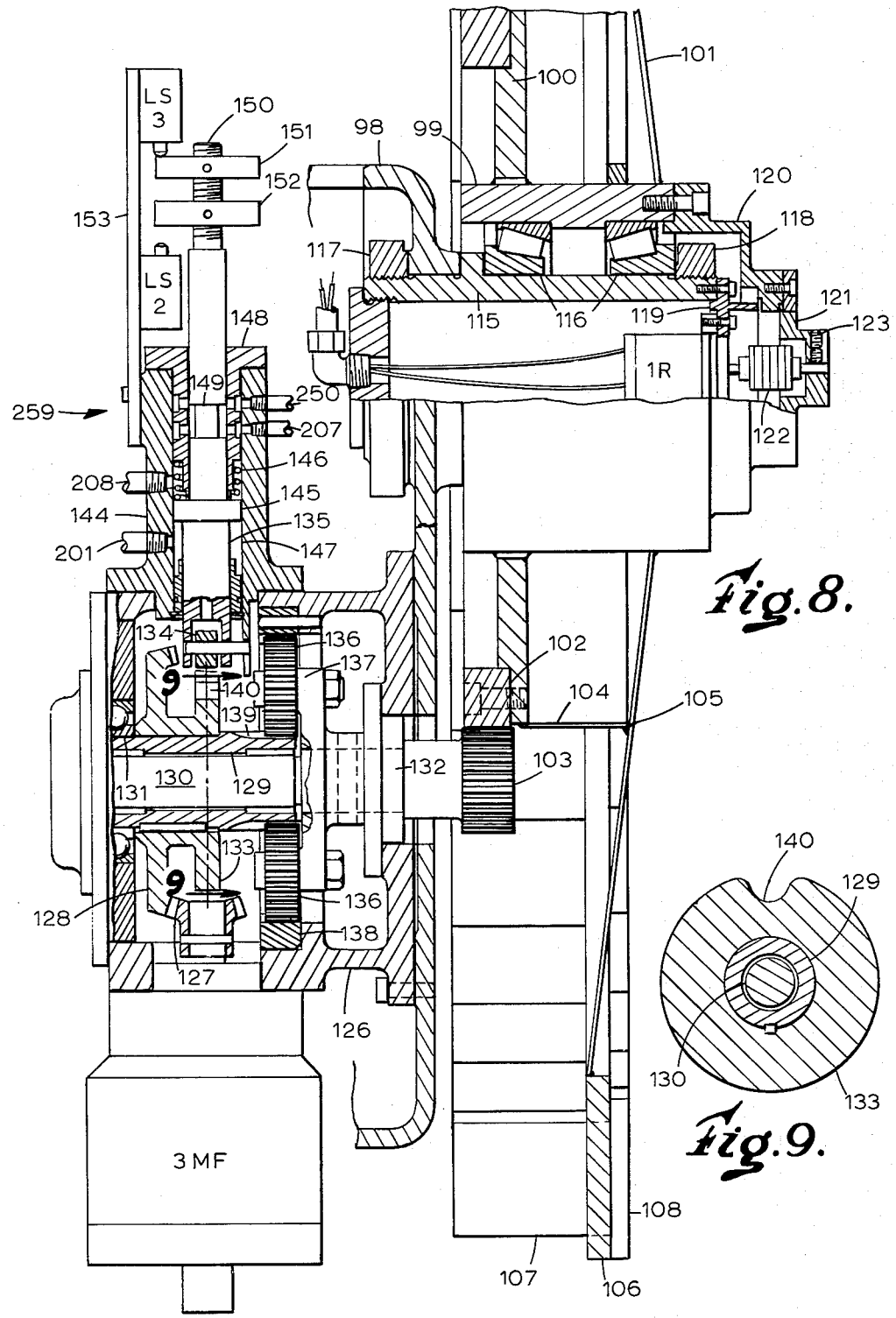

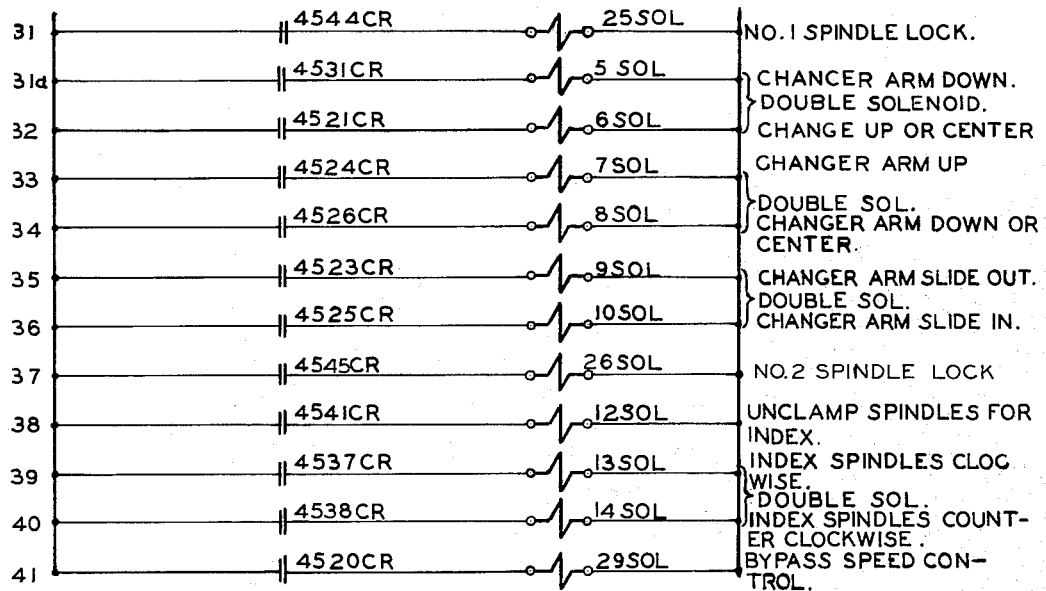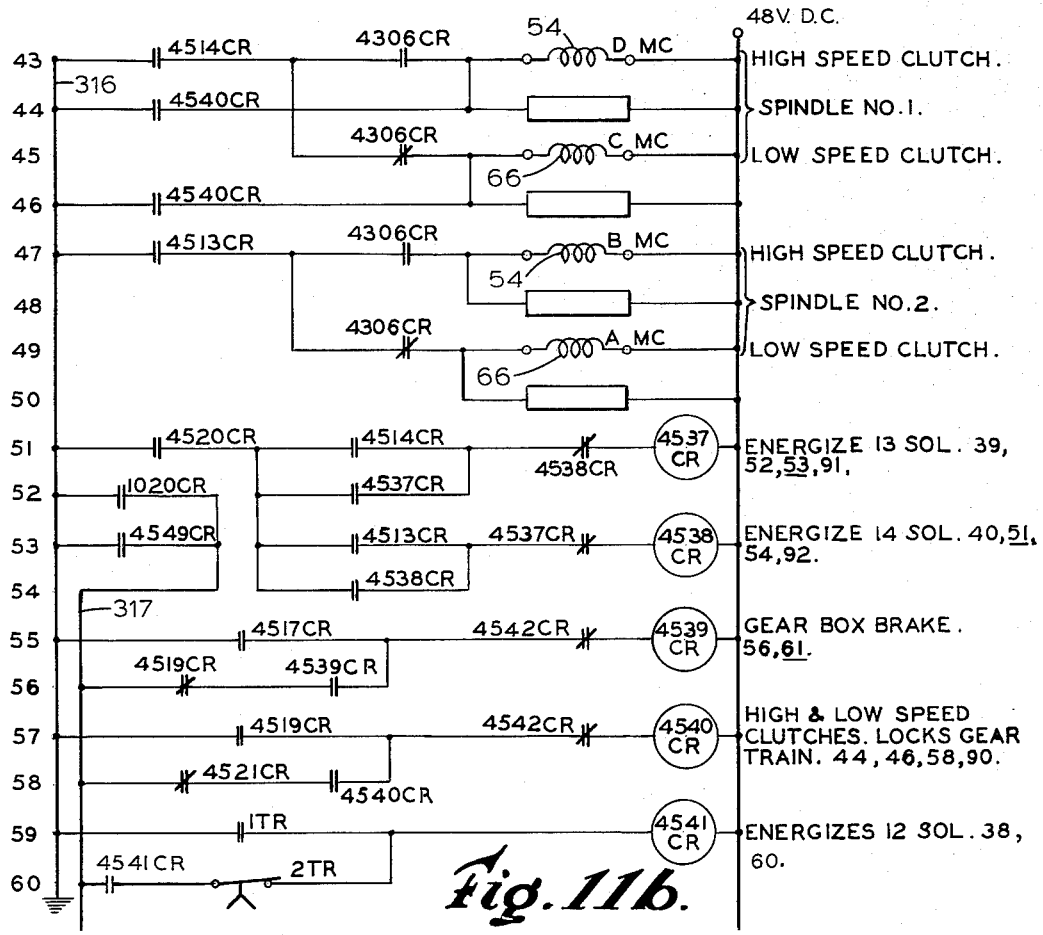
Fig. 11b.

United States Patent Office 3,259,976
Patented July 12, 1966

3,259,976
AUTOMATIC TOOL CHANGE MECHANISM
FOR MACHINE TOOL
Swan E. Bergstrom, Lewis A. Dever, and David I. McDonald, Cincinnati, Ohio, assignors to The Cincinnati Milling Machine Co., Cincinnati, Ohio, a corporation of Ohio
Filed Sept. 25, 1963, Ser. No. 311,587
7 Claims. (Cl. 29—568)

This invention relates to improvements in machine tools and, more particularly, to a mechanism for changing the cutting tools used by a machine tool in carrying out a series of machining operations on a workpiece in a fully automatic manner and without the necessity for any handling of the tools by the machine operator.

Known systems already exist for effecting the interchange of the tool in the spindle of a machine tool with a tool selected from a plurality of tools contained in a storage compartment associated with the machine tool. The known systems, however, possess certain disadvantages which limit their usefulness in the field of automatic tool handling such as the excessive time required for changing the tool in the spindle with another tool from the storage unit; the complexity of the mechanism utilized to effect the interchange, or in the size and cost of the inventory of special tool holders required for use with the system. Accordingly, it is an object of the present invention to provide an automatic tool change mechanism for a machine tool which overcomes the many disadvantages of the existing systems and provides a new approach to the problem of changing tools automatically during the course of a machining operation.

Another object of the invention is to provide a new tool change system in which interchangeable spindles are provided on the machine so that the tool in one of the spindles can be removed and replaced with a new tool while the other spindle is engaged in a machining operation.

A further object of the invention is to provide a machine tool having a pair of spindles indexable in a turret from an operating position to a non-operating position together with a mechanism for automatically replacing the tool in the non-operative spindle with a new tool from storage while the other spindle is carrying out a machining operation.

A further object of the invention is to provide a tool change mechanism of the indexable spindle type in which a rotatable transfer arm is employed for removing the old tool from the spindle in the non-operative position and replacing it with a new tool from the storage unit.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 1 is a side elevation of a horizontal milling machine having an automatic tool change mechanism which embodies teachings of the present invention.

FIG. 2 is a schematic representation of the spindle turret as viewed from the front of the machine.

FIG. 4 is a cross-sectional view taken along the line 4—4 in FIG. 1.

FIG. 5 is a cross-sectional view taken along the line 5—5 in FIG. 3.

FIG. 7 is a cross-sectional view taken along the line 7—7 in FIG. 2.

FIG. 8 is a cross-sectional view taken along the line 8—8 in FIG. 3.

FIG. 9 is a cross-sectional view taken along the line 9—9 in FIG. 8.

Figure 10A:
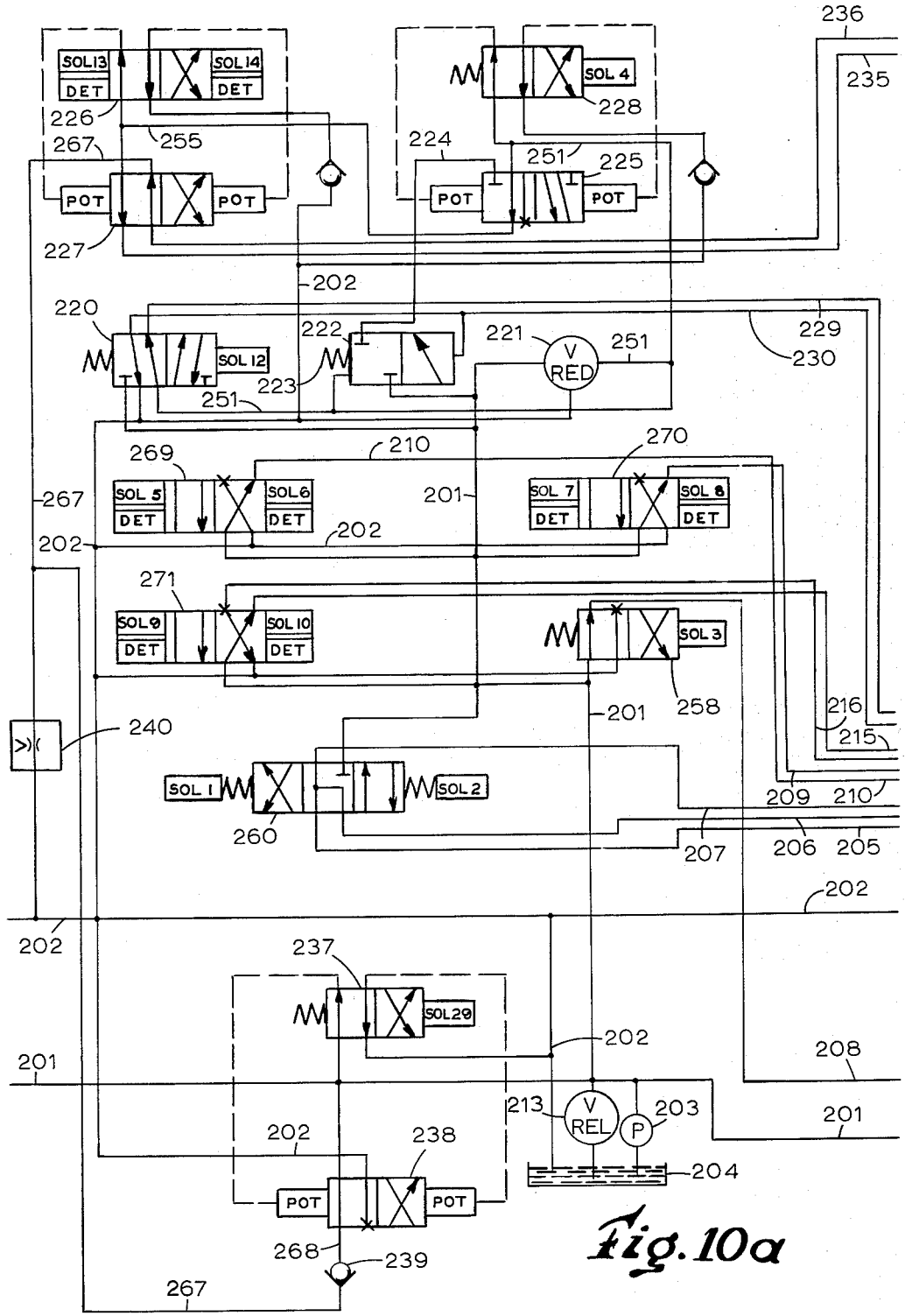
Figure 10B:
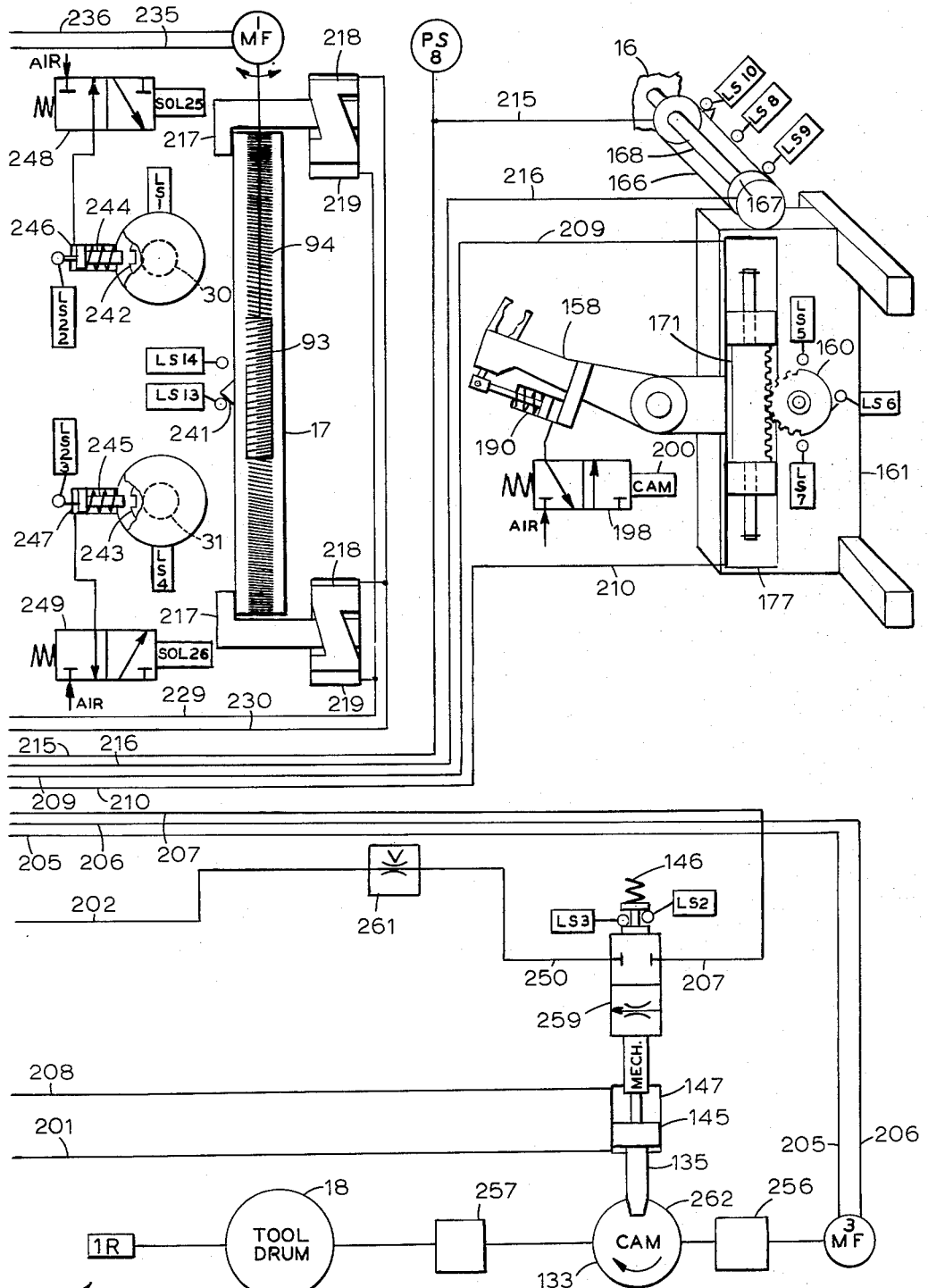

FIGS. 10a and 10b together comprise a hydraulic diagram for the tool change mechanism shown in the preceding figures.

FIGS. 11a to 11j, inclusive, constitute an electrical circuit diagram for the tool change mechanism shown in the preceding figures.

Referring to FIG. 1, the horizontal milling machine to which the invention has been shown applied, includes a horizontal bed 12 on which is mounted a vertical column 13. The column is provided with a pair of vertically extending parallel ways 14 and 15 which serve to guide a tool head 16 for vertical sliding movement on the column 13. The tool head 16 provides support for a rotatable spindle turret 17 and also for a tool storage unit or drum 18. Vertical movement of the head is effected by the lead screw 19 which meshes with a nut (not shown) carried by the head 16, the lead screw being driven by a hydraulic motor 20 mounted on top of the column 13.

The workpiece to be machined may be suitably clamped to a table 21 which is slidable on parallel ways 22 and 23 provided on the upper surface of a saddle 24. The saddle is in turn mounted for sliding movement in a direction perpendicular to that of the table by means of a pair of parallel ways 25 provided on the upper surface of the bed 12. Although not shown herein since it forms no part of the present invention, the table 21 and saddle 24 may be arranged for both manual and power feed movements along their respective ways in accordance with the customary practice in the machine tool art.

Figure 6:
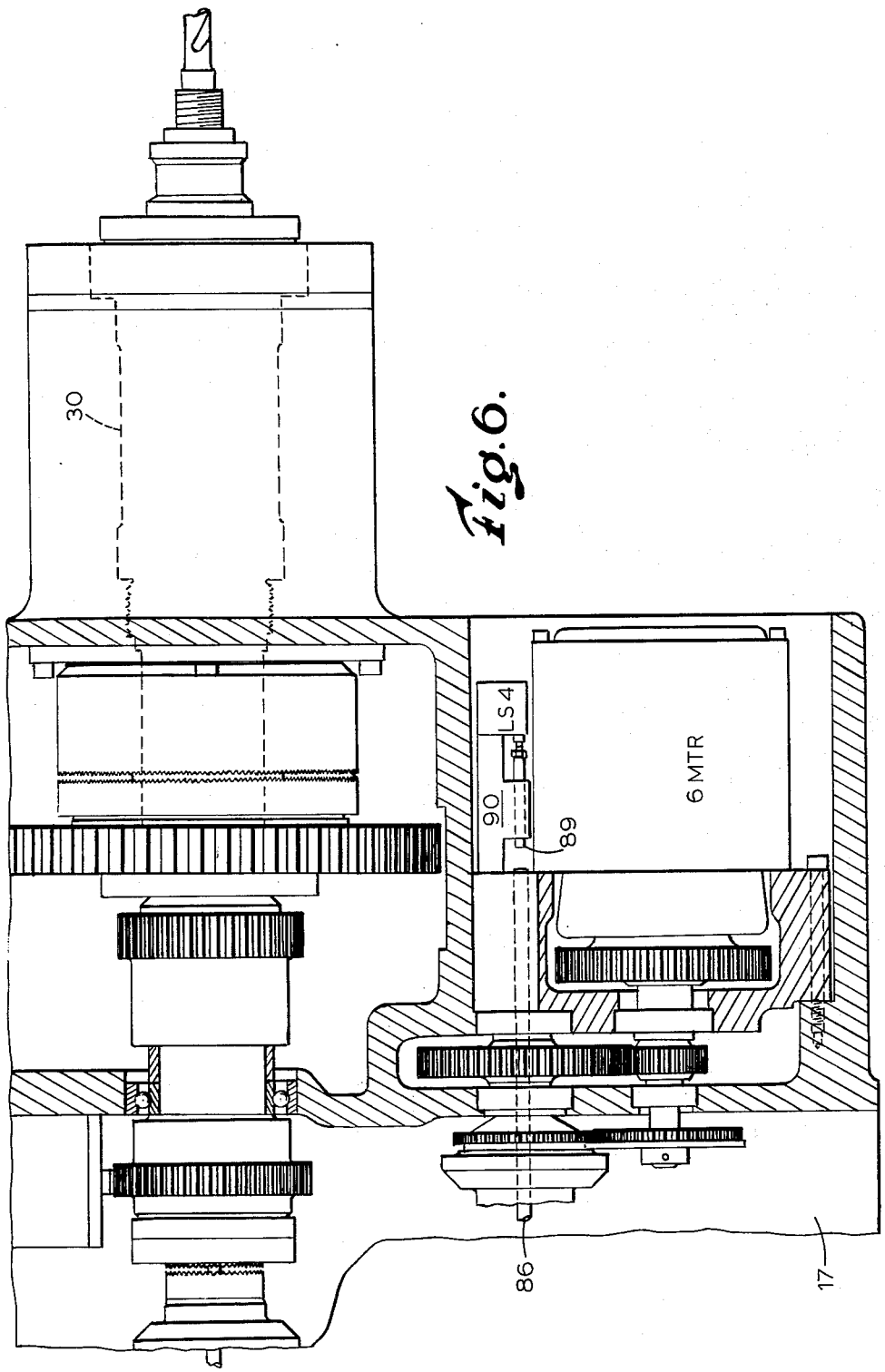
FIG. 6 is a cross-sectional view taken along the line 6—6 in FIG. 2.

As shown in FIGS. 6 and 7, the turret 17 has rotatably journaled therein a pair of spindles 30 and 31. Both spindles are arranged to be driven by a spindle drive motor 32 (FIG. 1) located on the bed 12 and connected by a belt drive 33 with a speed change gear box (not shown) also contained in the bed of the machine. The output shaft of the gear box drives a vertical, splined shaft 34 which passes through the tool head 16 as shown in FIG. 1. Within the tool head, the splined shaft 34 passes through an internally splined bevel gear 35 (FIG. 2) which is journaled for rotation in the head 16 but is held against vertical displacement in the head in the direction of the shaft 34. As shown in FIG. 2 the bevel gear 35 meshes with a bevel gear 36 secured to one end of a shaft 37 journaled in the head 16 and also in the turret 17. This is made possible by the fact that the axis of the shaft 37 coincides with the axis of rotation of the turret 17. The shaft 37 has secured thereto within the turret 17 a second bevel gear 38 which meshes with a pair of bevel gears 40 and 41 (FIG. 7) associated with the spindles 30 and 31, respectively. The bevel gears 40 and 41 drive jack shafts 42 and 43 which are connected by high and low speed gearing with their respective spindles. Inasmuch as both jack shafts and both spindles, as well as their associated high and low speed gearing, are of identical construction, only the jack shaft 43 and its associated spindle 31 shown in cross-section in FIG. 7 will be described.

Referring to FIG. 7, the jack shaft 43 is journaled at its opposite ends in the framework of the turret 17 and has affixed thereto a small diameter spur gear 47 which meshes with a large diameter spur gear 48 rotatably journaled on the spindle 31 by antifriction bearings 49. The jack shaft also carries a large diameter spur gear 50 which is rotatably journaled on the shaft by means of antifriction bearings 51. This gear has connected thereto the driven member 52 of an electro-magnetic clutch 53 provided with an energizing coil 54. The coil 54 is contained in a housing 55 which is secured to the framework of the turret and hence remains stationary. Surrounding the coil 54 and keyed to the jack shaft 43 is a driving member 56 of the clutch which is provided with clutch teeth adapted to engage with corresponding teeth provided on the driven member 52 when the coil is energized. Thereby, the large spur gear 50 may be selectively connected to the jack shaft and caused to rotate therewith. The gear 50 meshes with a small spur gear 57 which is keyed to the spindle 31. Therefore, when the clutch is energized, the spindle will be driven at high speed through the gears 50 and 57 while the gear 48 will rotate idly on the spindle.

Low speed rotation of the spindle is controlled by a second electromagnetic clutch 65 which has stationary energizing coil 66, a driving member 67 keyed to the gear 48, and a driven member 68 surrounding the coil 66 and keyed to the spindle 31. Thus, when the coil is energized, the gear 48 will be coupled to the spindle and will drive it at low speed, it being understood, of course, that the clutch 53 is deenergized at this time.

The spindle is supported for rotation within the turret by means of a rear anti-friction bearing 60 and a pair of forward anti-friction bearings 61 and 62. Also, it is provided with an axially extending bore for receiving a draw bar 69 which may be operated by a drive mechanism of the type shown in U.S. Patent No. 2,667,819, granted February 2, 1954, to Charles B. De Vlieg to secure a tool holder in the spindle nose. The draw bar is threaded at its forward end for engagement with corresponding threads provided in the rear end of a tool holder 70 having a straight shank 71 thereon which is adapted to be inserted in and withdrawn from the spindle nose by the automatic tool change mechanism. For this purpose the tool holder is provided with an annular groove 72 which is adapted to be engaged by a pair of gripping fingers on a tool change arm as will hereinafter be described.

The forward end of the draw bar is also provided with a flange 73 which affords a seat for a washer 74 which is slidable over the threaded end of the draw bar. The tool holder 70 is adapted to be gripped in the spindle nose by a squeeze bushing 75 which bears at its rear end against the washer 74 and at its forward end against the rear face of a locating ring 76. This ring is held in place on the spindle nose by a driver plate 77 which is fastened to the spindle nose by screws 78. The tool holder is equipped with serrations or teeth 79 which are adapted to engage with similar teeth provided around the inner periphery of the drive plate 77 to transmit driving torque from the spindle to the tool holder 70.

When the tool holder is inserted in the spindle nose by the automatic tool change mechanism, the draw bar 69 is pushed rearwardly in the spindle against the bias of a spring 83. When the draw bar is thereafter rotated by the electric drive motor 6MTR (FIG. 6) of the power draw bar mechanism, the threaded end of the bar will enter the threaded hole in the rear end of the tool holder and draw it into the spindle nose until a shoulder 85 thereon contacts the forward face of the locating ring 76. Thereafter, the squeeze bushing 75 will be compressed between the washer 74 and the rear face of the locating ring and will provide a gripping engagement between the tool holder and the spindle.

The draw bar 69 is provided with an axially extending bore for receiving a push rod 86 which is provided near its forward end with a flange 87 which is held by a compression spring 88 against a snap ring (not shown) seated in an annular groove in the bore immediately to the left of the flange 87 as viewed in FIG. 7. The push rod 86 extends rearwardly to a point adjacent the electric drive motor 6MTR (FIG. 6) where it terminates adjacent the forward end of a plunger 89. The plunger 89 is disposed in axial alignment with the push rod and is adapted to operate the plunger of a limit switch LS4 mounted on a frame bracket 90 which also supports the plunger 89. Thus, when the draw bar 69 is pushed rearwardly by the insertion of a tool holder in the spindle nose, the snap ring acting on flange 87 (FIG. 7) will likewise cause the push rod 86 to be moved rearwardly thereby operating plunger 89 and limit switch LS4. As will hereinafter be explained in connection with the electrical control circuits of the machine, this operation of the limit switch LS4 is utilized to initiate operation of the draw bar motor 6MTR.

To facilitate the automatic handling of the tools by the tool change mechanism, each tool of the series to be handled by the machine is mounted in a holder like the holder 70 shown in FIG. 7. Thereby, the shank portion of each tool and tool holder assembly are of identical length and diameter and each has a groove corresponding to the groove 72 for engagement by the gripping fingers of the change arm.

The turret 17 is supported for rotation about the axis of the shaft 37 (FIG. 1) by a circular way 91 on the tool head 16. Indexing movements of the turret are effected by a hydraulic motor 1MF which drives a shaft 92 carrying a worm 93 meshing with a worm wheel 94 secured to the turret 17. 180° indexing of the turret is determined by a pair of stops 95 secured thereto which are adapted to engage against a fixed abutment 96 on the tool head 16 thereby providing a positive locating stop for the turret in each of its two positions.

As mentioned earlier herein, the machine is provided with a tool storage means which, in the present embodiment of the invention, takes the form of a rotatable drum 18 supported on a drive box 98 secured to the rear side of the tool head 16. As shown in FIG. 8, the drum includes a hub 99 to which is welded a ring 100 and a frusto-conical disc 101. Bolted to the ring 100 is a ring gear 102 meshing with a drive pinion 103. Also secured to the ring 100 is a sleeve 104 which is welded about its periphery, as indicated by reference numeral 105, to the inner face of the disc 101 to provide lateral support therefor. Secured to the outer periphery of the disc 101 is a ring 106 which is apertured at equally spaced intervals about its circumference to receive receptacles 107. In the present embodiment there are 36 receptacles each of which is provided with a mounting flange 108 secured by bolts 109 (FIG. 5) to the ring 106. Each receptacle is also provided with a cylindrical well 110 (FIG. 3) having a diameter slightly larger than that of the shank 71 of tool holder 70. Each receptacle may also desirably be provided with a ball detent screw 111 for yieldably retaining the tools in the well 110 of the receptacles.

As shown in FIG. 8, the hub 99 of the tool drum is supported for rotation on a tubular axle 115 by means of anti-friction bearings 116. The axle 115 is secured to the drive box 98 by a nut 117 while the bearings 116 are retained on the axle by means of a nut 118 threaded on the outer end of the axle. A resolver 1R is supported within the axle 115 by means of a mounting plate 119, the shaft of the resolver being in axial alignment with the axis of the drum. The hub 99 of the drum is provided with a cover 120 which carries an end cap 121 which is provided with an axial bore for receiving the shaft of a flexible coupling 122. The inner end of the coupling is secured to the shaft of the resolver so that the shaft will be rotated in synchronism with the drum. Set screws 123 are provided in the cap 121 for enabling the shaft of the resolver to be adjusted relative to the drum in order to permit electrical alignment of the resolver when the machine is assembled.

Motive power for rotating the drum is furnished by a hydraulic motor 3MF (FIG. 8) which is supported on a gear housing 126 mounted inside the drive box 98. This motor drives a small bevel gear 127 which meshes with a larger bevel gear 128 keyed on a sleeve 129. The sleeve 129 is journaled by means of needle bearings on a shaft 130 to which is secured the drive pinion 103. The shaft 130 and sleeve 129 are supported for rotation within the housing 126 by means of anti-friction bearings 131 and 132. Also secured to the sleeve 129 for rotation with the bevel gear 128, is a cam disc 133 arranged to cooperate with a roller 134 mounted on the lower end of a plunger 135.

The sleeve 129 is provided at its rearward end with gear teeth 139 which serve as a drive pinion for the planetary gears 136 of an epicyclic gear train. These gears are journaled for rotation on a carrier 137 and also mesh with a ring gear 138 secured to the housing 126. The carrier is pinned to the shaft 130 so as to drive the pinion 103 at reduced speed as the pinion 139 is rotated by the bevel gears 127 and 128.

The cam 133 is provided with a notch 140 in its periphery which is adapted to be engaged by the roller 134 for the purpose of stopping the drum with a tool receptacle located in the tool change position. Since the cam 133 is provided with only one notch 140, the gear ratio between the cam and the drum as provided by the epicyclic gearing, and by the pinion 103 and ring gear 102, should be in the ratio of 36 to 1 inasmuch as 36 receptacles are provided on the drum.

The plunger 135 is provided with a piston 145 working in a cylinder 147 in a housing 144 and is urged by a compression spring 146 toward the cam 133. However, during rotation of the drum, the plunger is held away from the cam by hydraulic pressure delivered to the cylinder beneath the piston 145. The upper end of the plunger passes through a valve sleeve 148 where it is provided with a reduced portion 149 which serves as a valve for a purpose to be hereinafter described. The plunger terminates at its upper end in a threaded portion 150 on which are threaded limit switch actuator discs 151 and 152. These discs are adapted to cooperate with limit switches LS2 and LS3 which are supported on a bracket 153 fastened to the cylinder housing 144.

Figure 3:
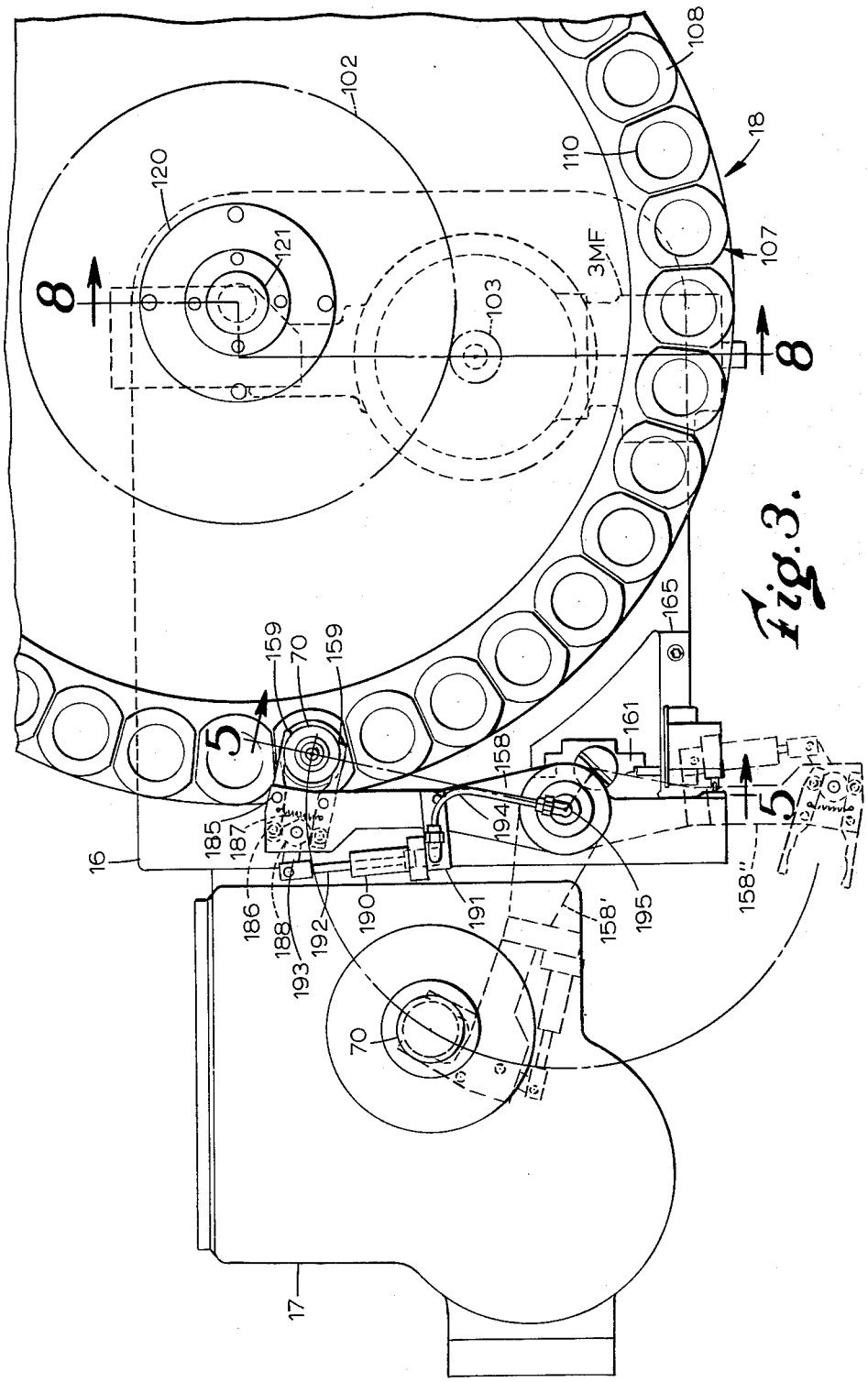
FIG. 3 is a rear elevation of a portion of the machine shown in FIG. 1.

For the purpose of transferring tools between the rear spindle and the tool drum, the machine is provided with a transfer or change arm 158 (FIG. 3) which is provided with a pair of gripping fingers 159 (see also FIG. 5) which are adapted to engage the groove 72 (FIG. 7) of the tool holder. As shown in FIG. 5, the transfer arm is keyed to the end of a shaft 160 which is journaled for rotation in a slide 161 by means of bearings 162 and 163. As best shown in FIG. 4, the slide is supported for in and out movement relative to the drum and spindle turret by means of ways 164 carried by a bracket 165 secured to the tool head 16 as shown in FIG. 3. In and out movements of the slide along the ways is effected by a hydraulic cylinder 166 formed in the slide 161 and fitted with a piston 167 mounted on a piston rod 168. The piston rod extends out of the cylinder 166 where it is suitably secured to the tool head 16 so as to remain stationary while the slide moves back and forth along the piston.

Rotary movements of the transfer arm are effected by a pinion 169 formed on the shaft 160 which meshes with a rack 170 provided on a plunger 171. The plunger 171 is received in a cylinder 172 carried on the slide 161 and extending transversely of the direction of travel of the slide. The plunger 171 is formed at each end with a piston 174 which has a sliding fit inside a sleeve 175. The sleeve in turn is slidable within the cylinder 172 and is formed at its outer end with a flange 176 which is accommodated in a counterbore 177 formed in each end of the cylinder 172. The inner end of each sleeve engages against a shoulder 178 formed on the plunger 171. As a result of this construction, when the pressure in the two cylinders 177 is equal, the plunger will be centered as shown in FIG. 4 with the transfer arm located in its "Center" position as indicated in dashed outline 158' in FIG. 3. When the pressure in the upper cylinder is greater than that in the lower cylinder, the plunger 171 will be moved downward until stopped by the adjustment screw 179. At this time the arm will be located in its "Down" position as indicated in dashed outline 158" in FIG. 3. When the pressure in the lower cylinder is greater than that in the upper cylinder, the plunger will be moved upwardly until stopped by the adjustment screw 180, and the transfer arm then will be located in its "Up" position as shown in full lines in FIG. 3.

Referring to FIG. 3, it will be noted that the fingers 159 are pivoted at 185 on the arm 158, the rear ends of the fingers bearing rolls 186 which are urged towards one another by a tension spring 187 stretched between the fingers. The opening and closing of the fingers is controlled by a cam 188 engaging rolls 186 which is journaled for rotation about its central axis in the arm 158. Rotation of the cam is effected by means of an air cylinder 190 mounted on a bracket 191 secured to the arm 158. The air cylinder is provided with a piston rod 192 which is pivotally connected to an arm 193 fastened to the cam 188. Air under pressure is supplied to the air cylinder 190 through a tube 194 which is connected by an elbow 195 (FIG. 5) with a bore 196 extending through the center of the shaft 160. The opposite end of the bore is connected by an air gland 197 with a conduit on the slide 161 which receives air from a valve 198 (FIG. 4) also carried on the slide. The valve is suitably connected to a source of air under pressure and is provided with an actuating plunger 199 which is arranged to be operated by a cam 200 carried by the bracket 165. When the slide is in its "In" position, as shown in FIG. 5, the plunger 199 is released and the supply of air to the air cylinder 190 is cut off by the valve 198. This allows the piston to be retracted within the cylinder by means of an internal spring thereby rotating the cam 188 counterclockwise from the position shown in FIG. 3. Hence, the rolls 186 on the fingers 159 will move onto the low portions of the cam, and the spring 187 will open the fingers permitting them to be withdrawn radially from the tool holder as the arm 158 is rotated about its pivot. However, the fingers still remain in engagement with the groove 72 in the tool holder and will cause the tool holder to be removed axially from the receptacle in the drum, or from the nose of the spindle, when the arm is moved axially outward by movement of the slide 161. As the slide moves outward from the position shown in FIG. 5, the plunger 199 will ride up on the fixed cam 200 and open the air valve whereby the fingers 159 will securely clamp the tool as it is finally removed from the receptacle or spindle.

The position of the slide is sensed by limit switches LS8, LS9 and LS10 (FIGS. 4 and 5) which are supported on the bracket 165 and have their operative plungers located in the path of travel of raised surface or pad 211 provided on the slide 161. Hence, when the slide is in the position shown in FIG. 5, the limit switch LS10 will be operated; when the slide is in an intermediate position the limit switch LS8 will be operated, and when the slide is in its "Out" position the limit switch LS9 will be operated.

The rotational position of the transfer arm is sensed by a series of limit switches LS5, LS6, and LS7 which are mounted on the slide 161 with their plungers lying over cams 212 secured to a tenon on the end of shaft 160. The cams are so arranged on the shaft that when the transfer arm is in its "Down" position the limit switch LS5 is operated; when the arm is in its "Center" position the limit switch LS6 is operated, and when the arm is in its "Up" position the limit switch LS7 is operated.

Referring now to the hydraulic diagram shown in FIGS. 10a and 10b, a pump 203 driven by any electric motor (not shown) withdraws hydraulic fluid from a reservoir 204 and delivers it under pressure to a line 201. The pressure in the line 201 is determined by the setting of the relief valve 213 connected between the pressure line 201 and the reservoir 204. Fluid is returned to the reservoir after being utilized in various hydraulic devices in the circuit by a return line 202. As shown in FIG. 10b the tool turret 17 is provided with clamps 217 which are operated by piston cams 218 which are fitted in hydraulic cylinders 219. The flow of hydraulic fluid to the cylinders is controlled by a solenoid valve 220 (FIG. 10a) which effects clamping of the turret when the solenoid SOL 12 is deenergized. As shown herein, pressure from the line 201 is supplied to a reducing valve 221 after which the fluid, at reduced pressure, is delivered through a line 251 to the valve 220. When the solenoid is deenergized, the line 251 is connected by the valve with the line 229 which is connected to the lower ends of the clamp cylinders 219. The upper ends of the cylinders are connected to a line 230 which at this time is connected through the valve 220 to the return line 202. Hence, the clamp pistons 218 will be moved upwardly as viewed in FIG. 10b thereby pulling down the clamps against the clamp ring of the turret. To unclamp the turret, the solenoid SOL 12 is energized thereby shifting the valve to the left in FIG. 10a so as to connect pressure line 201 with the line 230 and connecting the line 229 to the return line 202. Thereby, the pistons 218 will be shifted downwardly and release the clamps to permit indexing of the turret.

When the turret is unclamped, a shuttle valve 222 will be operated as a result of the increased pressure in line 230. When the solenoid SOL 12 is deenergized and the turret clamped, the valve 222 is held in the position shown by the combined effort of a spring 223 and pressure from line 251 acting on the left-hand of the valve. However, when the solenoid SOL 12 is energized and the valve 220 shifted to the left, the high pressure fluid delivered to line 230 will be supplied to the right-hand end of the valve 222 and cause it to be shifted to the left against the urgency of spring 223 and the pressure in line 251. This will cause high pressure fluid in line 201 to be delivered to a line 224 connected to a control valve 225. After the turret is unclamped and before an indexing operation is initiated, the stop 95 is urged against the fixed stop 96 by the hydraulic motor 1MF operated under reduced pressure. At this time pressure will be supplied to the motor 1MF from the pressure reducing valve 221 through the line 251 thence through the control valve 225 and a line 255 to a reversing valve 227. Depending upon the position of a solenoid pilot valve 226, pressure will be supplied either to a line 235 or to a line 236 both of which are connected to the motor 1MF. The valve 226 is detented, that is, when both solenoids are deenergized, the valve will remain in the position to which it was last moved. The valve 226 pilots the valve 227 which in turn controls the flow of pressure fluid to and from the hydraulic motor 1MF.

The control valve 225 is piloted by a solenoid valve 228 having an operating solenoid SOL 4. When this solenoid is energized with the turret unclamped, the valve 225 will be shifted to the left, and high pressure fluid from line 201 will be delivered through lines 224 and 255 to the valve 227 and thence to the hydraulic motor 1MF. At the same time that the valve 228 is actuated, a solenoid valve 237 will be operated by its solenoid SOL 29 and cause a valve 238 to be shifted to the left. This will cause a return line 267 from the hydraulic motor 1MF to be connected through a check valve 239 and a line 268 to the return line 202. This will remove from the return line 267 a restriction normally provided by an adjustable throttle valve 240 and permit the hydraulic motor to run at full speed and effect rapid indexing of the turret. As the turret approaches the end of its indexing movement, a dog 241 (FIG. 10b) on the turret operates a limit switch LS13 or LS14 and deenergizes solenoids SOL 4 and SOL 29. This will reduce the speed of the turret and prevent hammering of the stop 95 against the fixed stop 96.

As diagrammatically illustrated in the upper left hand corner of FIG. 10b, the spindles 30 and 31 carry locking discs 242 and 243 (FIG. 7) which are adapted to be engaged by plungers 244 and 245 actuated by air cylinders 246 and 247. This is for the purpose of holding the spindles against rotation during operation of the power draw bar mechanism. The air cylinders 246, and 247 are actuated under the control of solenoid valves 248 and 249. Thus, when a solenoid SOL 25 or SOL 26 is energized, its associated valve will be shifted to the left as viewed in FIG. 10b, thereby delivering air to the cylinder 246 or 247 and engaging the plunger 244 or 245 with the notched disc 242 or 243. When the solenoid is deenergized, the valve will be returned to the position shown in the figure and the plunger will be spring returned to its retracted position. Limit switches LS22 and LS23 are provided to sense the positions of the locking plungers 244 and 245, respectively.

The drive of the tool storage drum 18 by the hydraulic motor 3MF is schematically illustrated in at the bottom of FIG. 10b. As there shown, the hydraulic motor drives the cam 133 (see also FIG. 8) through reduction gearing 256 which, as shown in FIG. 8 is represented by bevel gears 127 and 128. The drive is continued from the cam to the tool drum through further reduction gearing 257 which, as shown in FIG. 8, is represented by the epicyclic gearing including pinion 139, planetary gears 136, and ring gear 138; drive pinion 103 and ring gear 102.

As earlier noted herein, the cam plunger, or pin, 135 is adapted to be operated by the piston 145 working in the cylinder 147. The bottom of this cylinder is connected with the high pressure line 201 and the top of the cylinder is connected by a line 208 with a solenoid valve 258. When the actuating solenoid SOL 3 for this valve is deenergized as shown in FIG. 10a, hydraulic fluid under pressure will be supplied from the line 201 to the line 208 and thereby to the upper side of the piston 145. Due to the differential areas on the piston 145, the came pin 135 will be urged into engagement with the cam 133. When the notch in the cam moves beneath the pin 135, the latter will enter the notch and locate the tool drum with one of the receptacles in position for its associated tool to be engaged by the gripping fingers of the transfer arm. When, however, the solenoid SOL 3 is energized, the valve 258 will be moved to the left thereby connecting the upper end of the cylinder 147 with the return line 202 whereupon the cam pin will be elevated by the pressure constantly applied to the underside of the piston 145 from line 201.

As mentioned earlier herein, the portion of the plunger 135 (FIG. 8) extending above the piston 145 passes through a valve sleeve 148 where it is provided with a reduced portion 149 operates as a valve spool for metering the flow of oil through a pair of ports connected to lines 207 and 250. The thus constituted valve is designated by reference numeral 259 in FIGS. 8 and 10b. When the cam plunger, or pin, 135 is in its raised position as shown in FIG. 8, communication is provided between the lines 207 and 250 by the valve 259. However, when the cam pin is lowered from this position, communication between the lines is restricted and finally cut off when the pin seats in the notch 140.

Operation of the drum drive motor 3MF is controlled by a solenoid valve 260 which causes the motor lines 205 and 206 to be short circuited when the valve is in its neutral position as shown in FIG. 10a. However, when the valve is shifted to the right upon energization of solenoid SOL 1, pressure line 201 will be connected to motor line 205 while motor line 206 will be connected through the line 207 with the valve 259. If, at this time, the solenoid SOL 3 is energized, the cam pin will be raised to the position shown in FIG. 8 so that the line 207 will be connected through valve 259 to the line 250 which is connected through an adjustable throttle valve 261 with the return line 202. The throttle valve 261 provides a manual control for the speed of rotation of the tool drum.

When it is desired to stop the drum, the cam pin 135 is released for movement toward the cam by deenergization of solenoid SOL 3 as the notch 140 is approaching the cam pin. The cam is provided with a section of decreasing diameter in the vicinity of the portion of the circumference designated by reference numeral 262 so that the valve 259 will gradually cut off communication between lines 207 and 250 as the notch in the cam approaches the cam pin. This throttles the return fluid from the motor and gradually reduces the speed of the drum. When the cam pin drops into the notch, the ports of the valve will be completely closed and the hydraulic motor 3MF will stop. At this time, solenoid SOL 1 will also be deenergized so as to short circuit the motor lines 205 and 206 and thereby deenergize the motor. Rotation of the drum in the opposite direction is caused by energization of the solenoid SOL 2 which causes the motor line 206 to be connected to the pressure line 201 and the motor line 205 to be connected to the exit line 207.

Positioning of the transfer arm 158 is effected under the control of a pair of solenoid operated valves 269 and 270. As indicated on the drawing, these are detented valves which will remain in the position to which last moved upon deenergization of the solenoids. When the valves are in the positions shown in FIG. 10a, fluid pressure from the line 201 will be supplied to both cylinder lines 209 and 210 thereby causing the rack plunger 171 to be centered in the cylinder and hold the transfer arm in its "Center" position. If now solenoid SOL 5 is energized, the valve 269 will be shifted to the right and the line 210 will be connected to the return line 202. Thereby, the rack piston 171 will move downwardly and cause the arm 158 to move to its "Down" position. On the other hand, if solenoid SOL 7 is energized instead of solenoid SOL 5, the line 209 will be connected to the return line 202 and the rack piston will move upwardly and cause the arm to move to its "Up" position. The arm will remain in the position to which it is last moved until such time as one of the valve solenoids is again energized to actuate its associated valves and move the arm to one of its other positions.

In and out movements of the slide 161 are effected by a solenoid valve 271 which controls the flow of hydraulic fluid to and from the cylinder 166. This is also a detented valve and will remain in the position to which last set. When the valve is in the position shown in FIG. 10a, fluid under pressure from line 201 will be connected through the valve to cylinder 215 while the cylinder line 216 will be connected to the return line 202. Hence, the cylinder 166 and slide 161 will be moved to the "In" position shown in FIG. 10b. If, now, solenoid SOL 9 is energized, the valve 271 will be shifted to the right and cylinder line 216 will be connected to pressure while line 215 will be connected to exhaust. Thereby, the slide will be moved to its "Out" position.

*Electrical control circuits*

The electrical control circuits for effecting automatic sequencing of the various elements of the tool change mechanism are shown in FIGS. 11a to 11f, while the circuits for controlling the rotation and positioning of the tool storage drum to bring a desired receptacle thereon into the tool change position are shown in FIGS. 11g to 11j. Since an appreciation of the functioning of the latter circuits is required for a clear understanding of the manner in which the automatic sequencing circuits operate to effect automatic tool changing, an explanation of the drum positioning unit will first be given followed by a description of the sequence control unit.

Figure 11A:
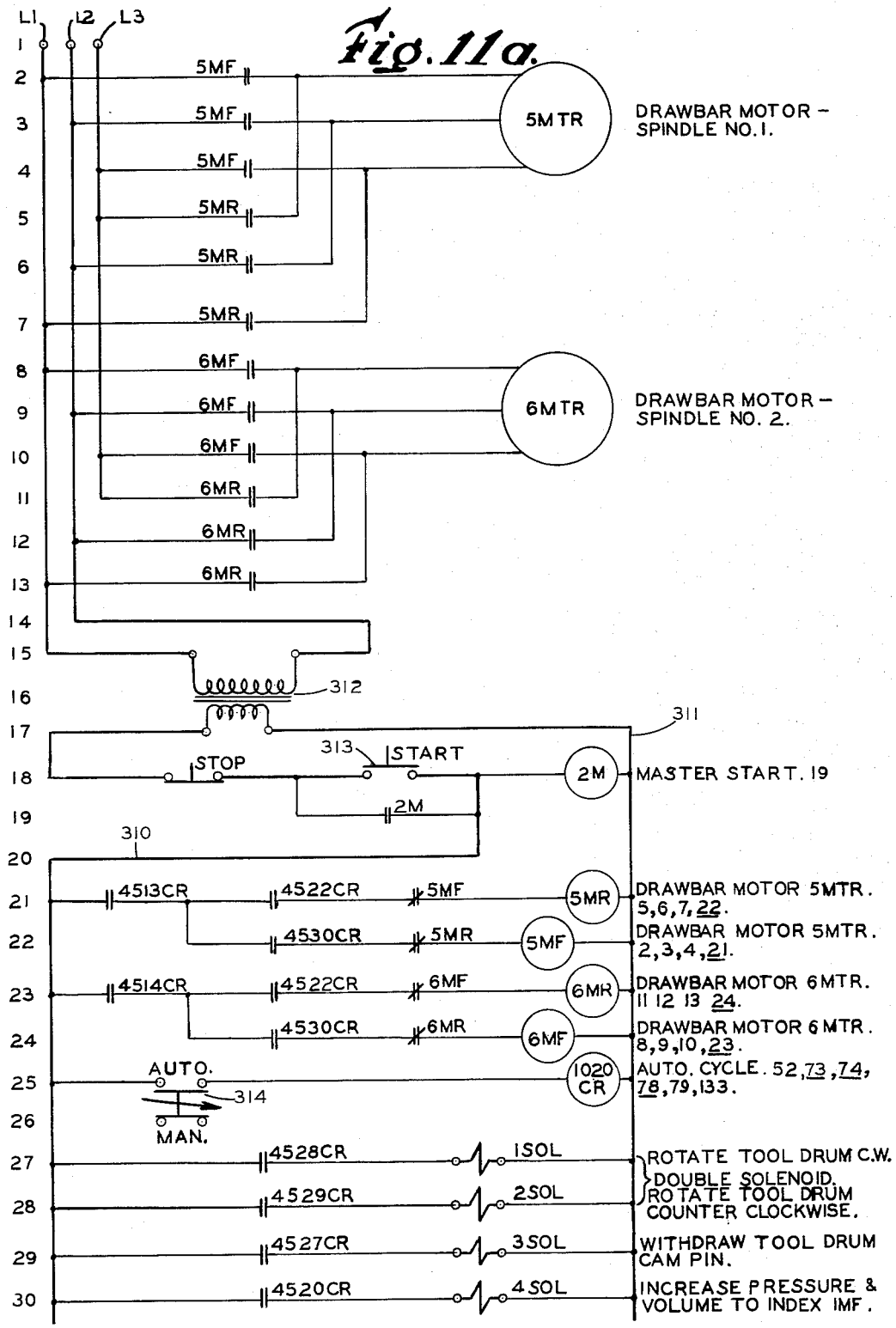
Figure 11C:
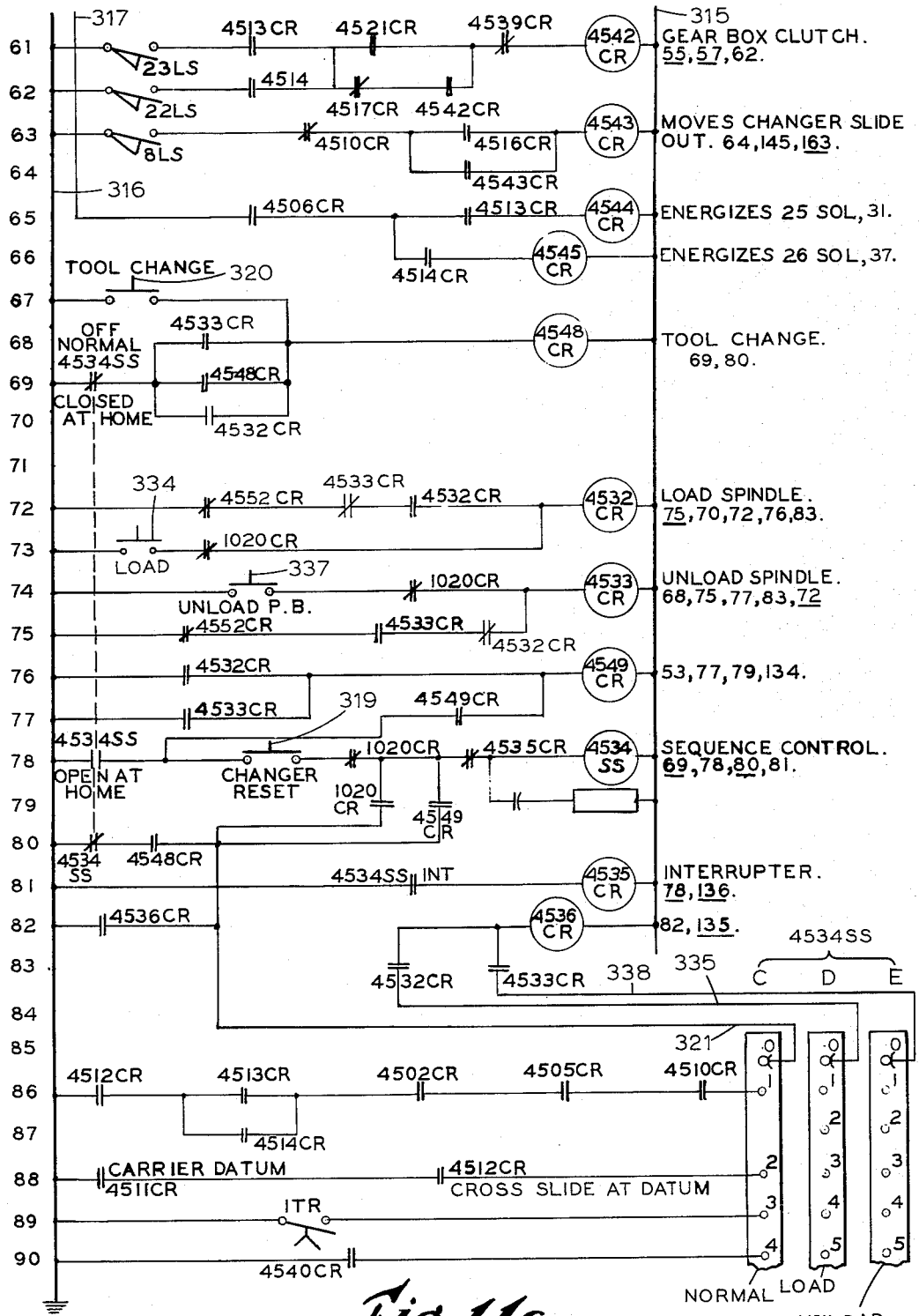
Figure 11D:
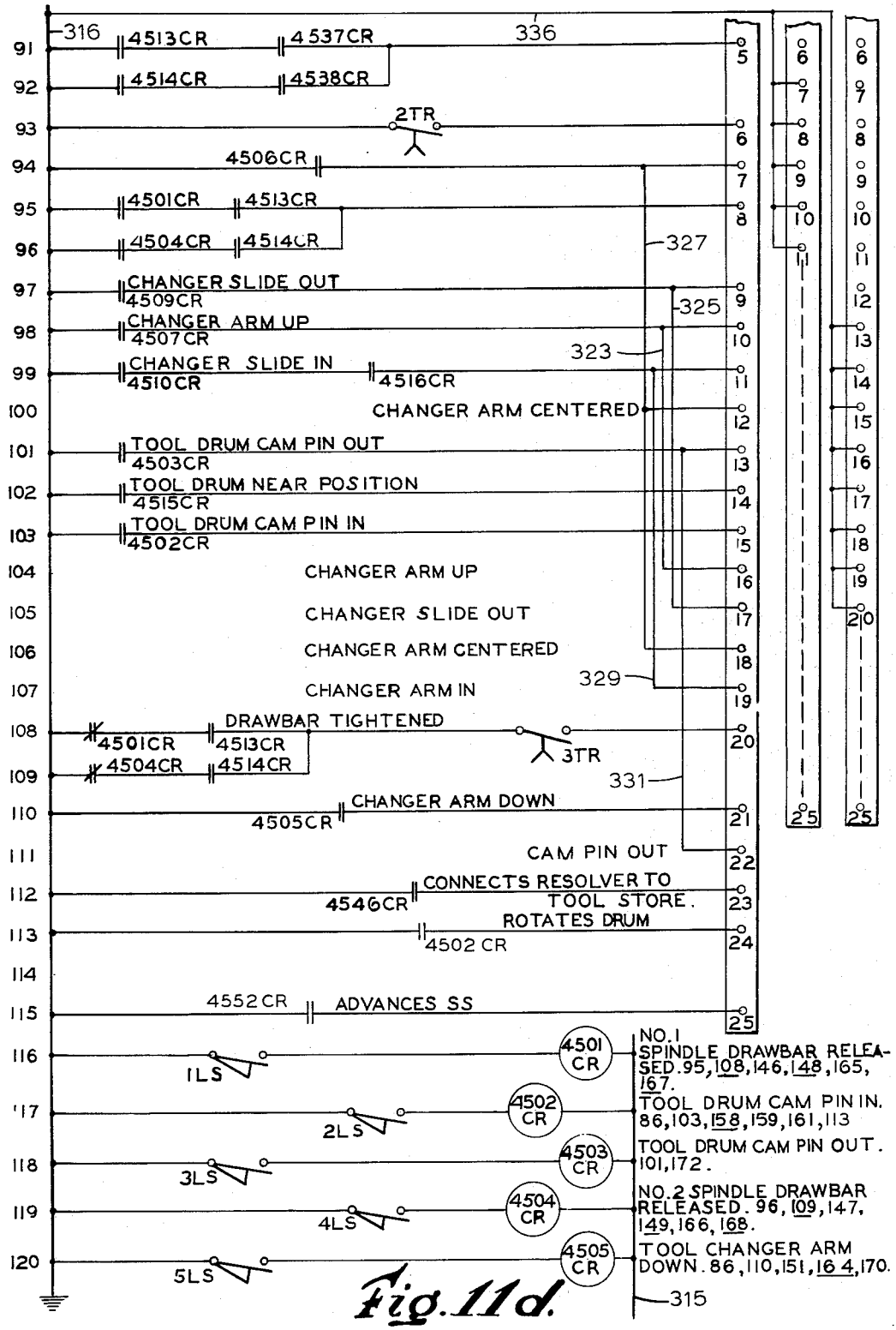
Figure 11E:
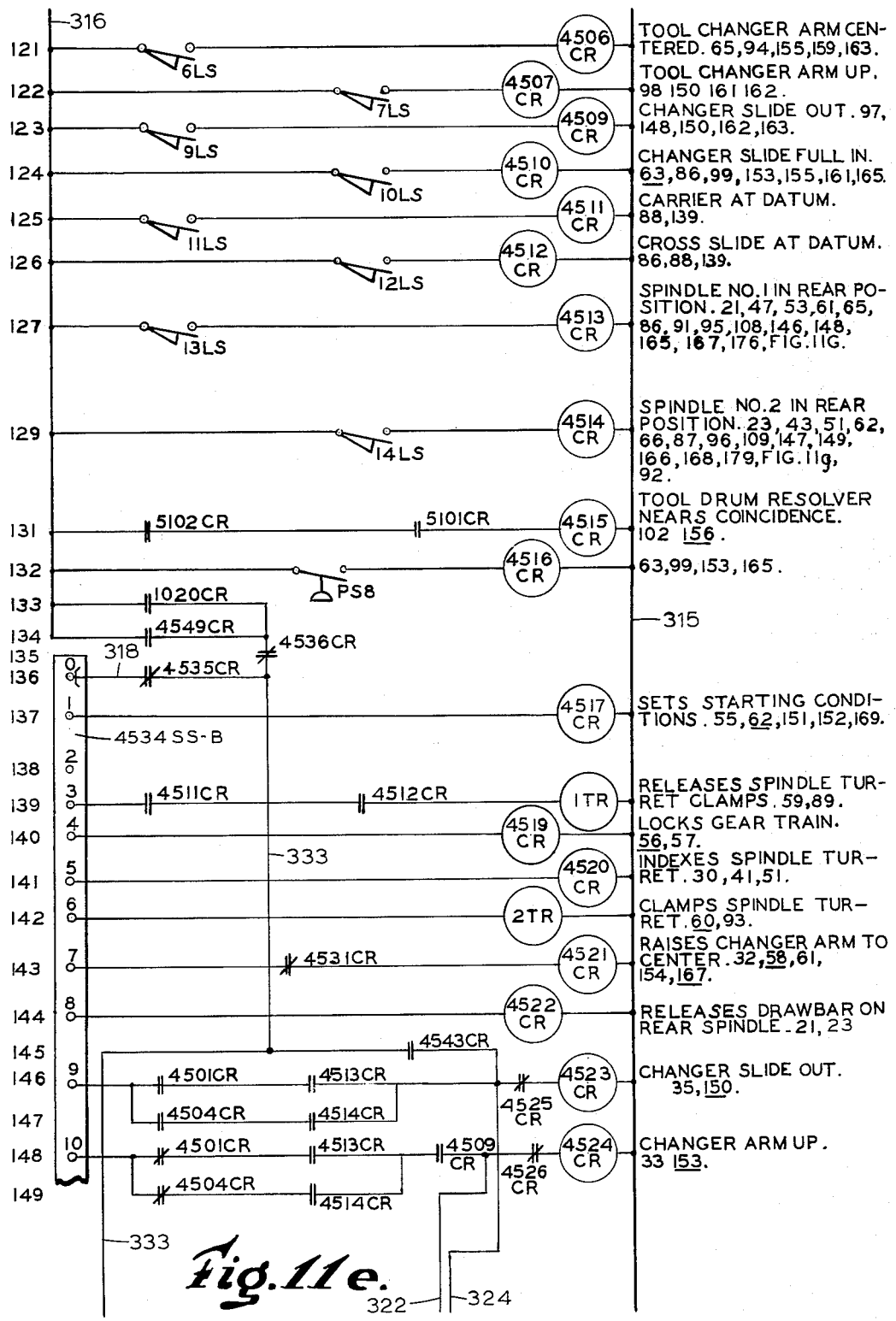
Figure 11F:
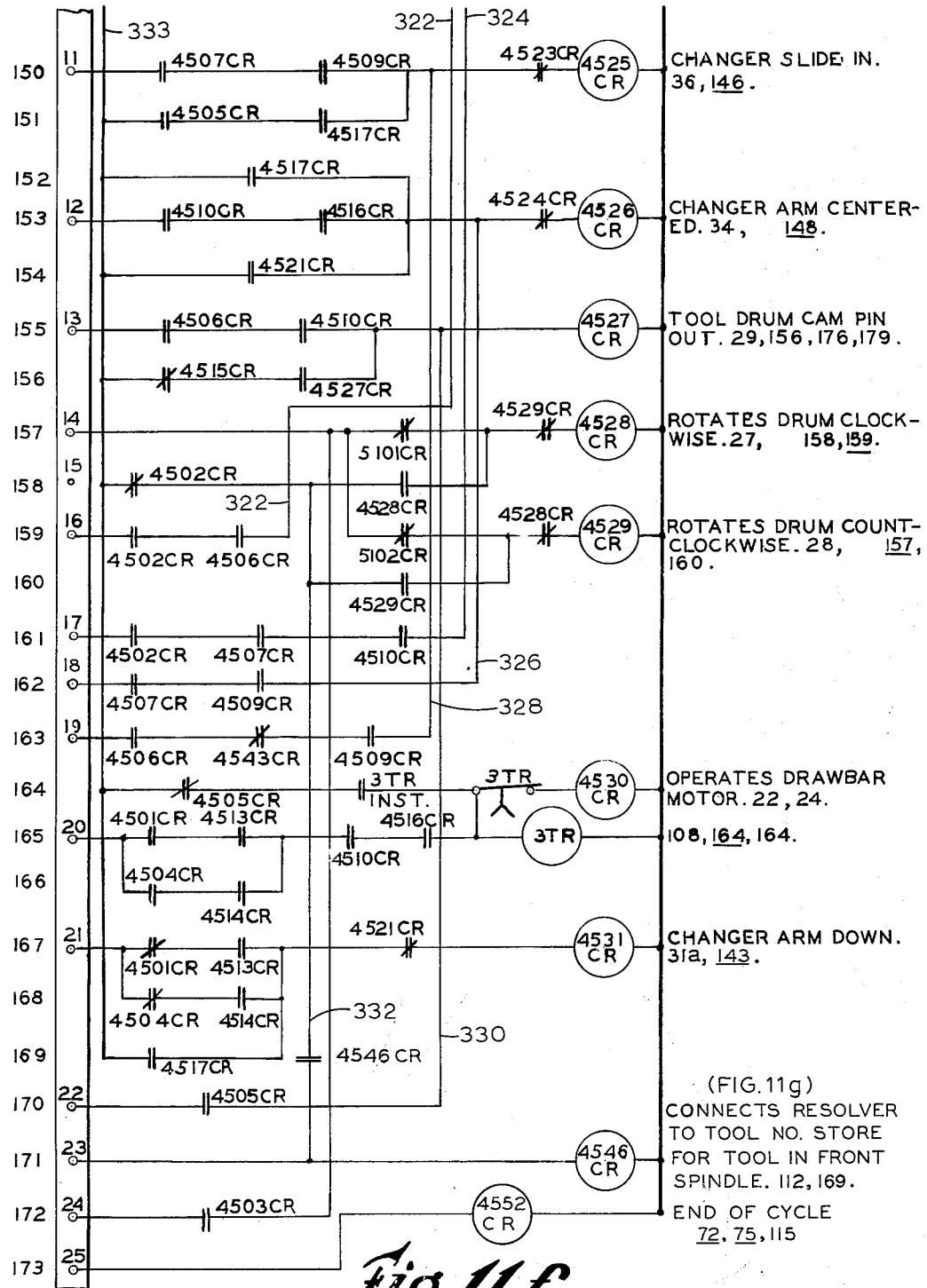

Assuming the machine to be operating on a workpiece with the cutting tool in the No. 1 spindle 30, the No. 2 spindle 31 being at this time in the rear position, the location of the next tool in the drum to be placed in the No. 1 spindle is entered into the control so as to be ready for use immediately following the next indexing operation of the turret. This location may be entered as a number where the receptacles on the drum are numbered in order to facilitate programming of the automatic machining operation. This entry may be effected by means of switches as shown in FIG. 11h which may either be set manually, or may be set automatically from information derived from a tape reader. In any event, the tens digit of the number is entered by means of switch bank 4201SS–B while the units digit is entered by the switch bank 4202SS–B. Since two spindles are present in the machine, two tool stores are provided which are hereinafter designated as store No. 1 and store No. 2, these stores being associated with spindle No. 1 and spindle No. 2, respectively. Each store is capable of selecting any one of the 36 different receptacles provided on the drum and each store includes a stepping switch, the stepping switch 4205SS being associated with the No. 1 store and the stepping switch 4208SS being associated with the No. 2 store. Since these are 26 position switches and since there are 36 receptacles, it is necessary to utilize two banks in order to obtain a counting sequence from one to 36. Thus, as shown in FIG. 11h, studs 1 to 25 of bank 4205SS–A are identified with the receptacles numbered 1 to 25 while the studs 1 through 11 of bank 4205SS–B are identified with the receptacles numbered 26 through 36. It will also be observed that the studs 1 through 9 of bank A are connected with studs 1 through 9 of the units digit bank 4202SS–B; studs 10 through 19 of bank A are connected with studs 0 through 9 of bank 4202SS–B; studs 20 through 25 of bank 4205SS–A and studs 1 through 4 of bank 4205SS–B are connected with studs 0 through 9 of bank 4202SS–B, and studs 5 through 11 of bank 4205SS–B are connected with studs 0 through 6 of bank 4202SS–B. Thus, the studs of banks A and B of stepping switch 4205SS represent the units digit of the receptacle number in a repeating series from 0 to 9. The studs of banks 4208SS–A and –B associated with store number 2 are similarly connected to the studs of units digit switch bank 4202SS–B by a cable indicated by reference numeral 275.

It will further be observed from FIG. 11h that studs 0, 1, 2 and 3 of the tens digit bank 4201SS–B are connected to studs of banks 4205SS–C and –D connected in decade groups as indicated by the jumpers between the studs. The studs of tens digit switch bank 4201SS–C are similarly connected to decade groups of studs in banks 4208SS–C and –D. It will further be noted that the wiper of units digit bank 4202SS–B is connected to ground while the wipers of tens digit banks 4201SS–B and –C are connected through normally open relay contacts 4204CR and 4207CR with the operating coils of relays 4203CR and 4206CR, respectively, which have their opposite terminals connected to a voltage source 276.

Figure 11G:
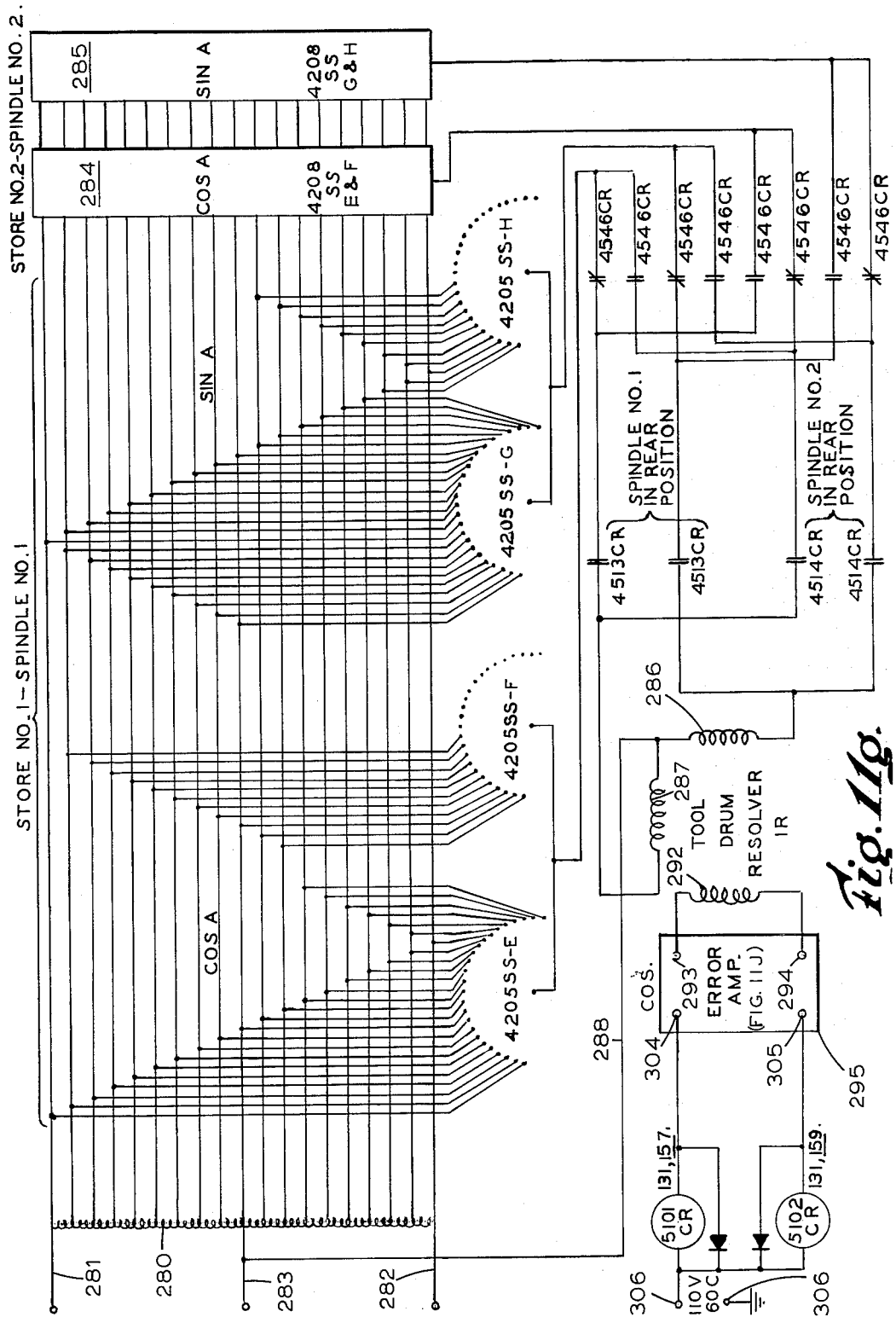
Figure 11H:
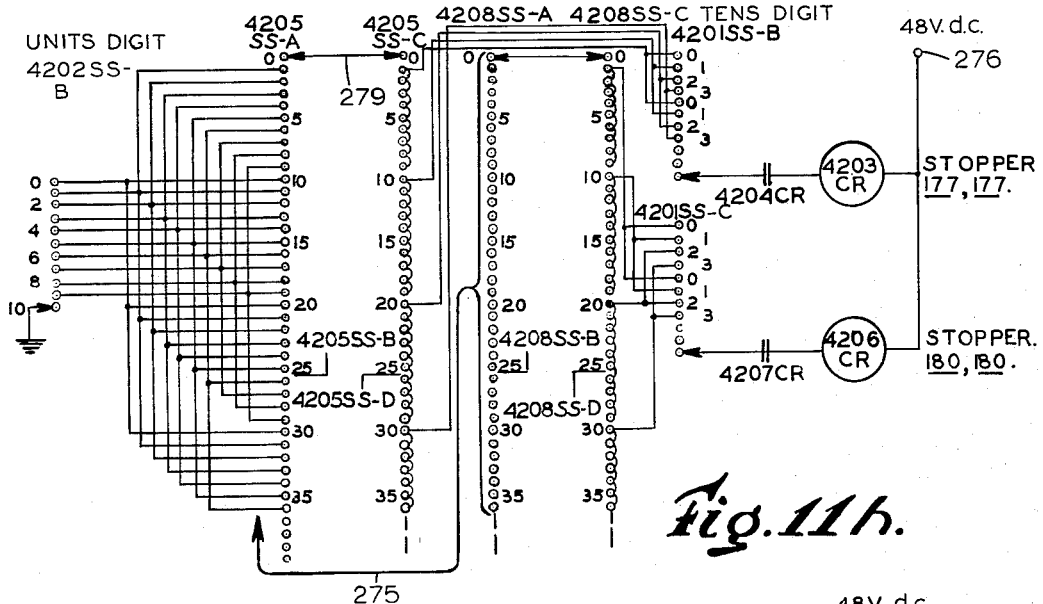
Figure 11I:
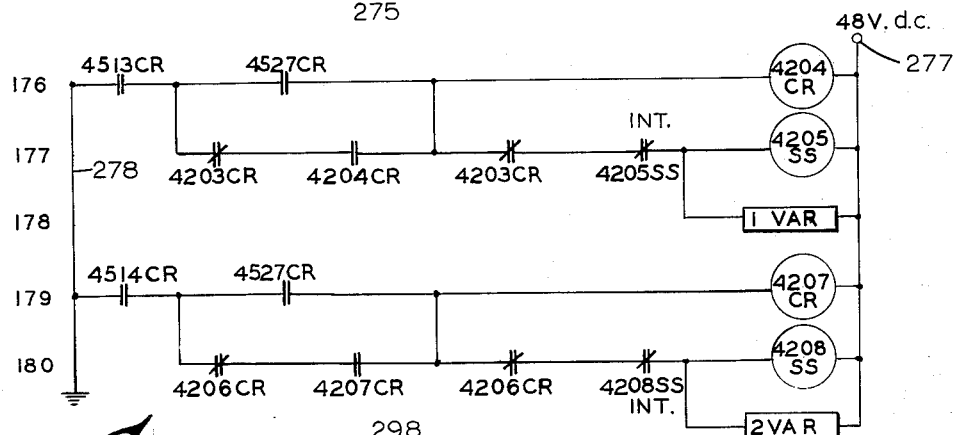
Figure 11J:
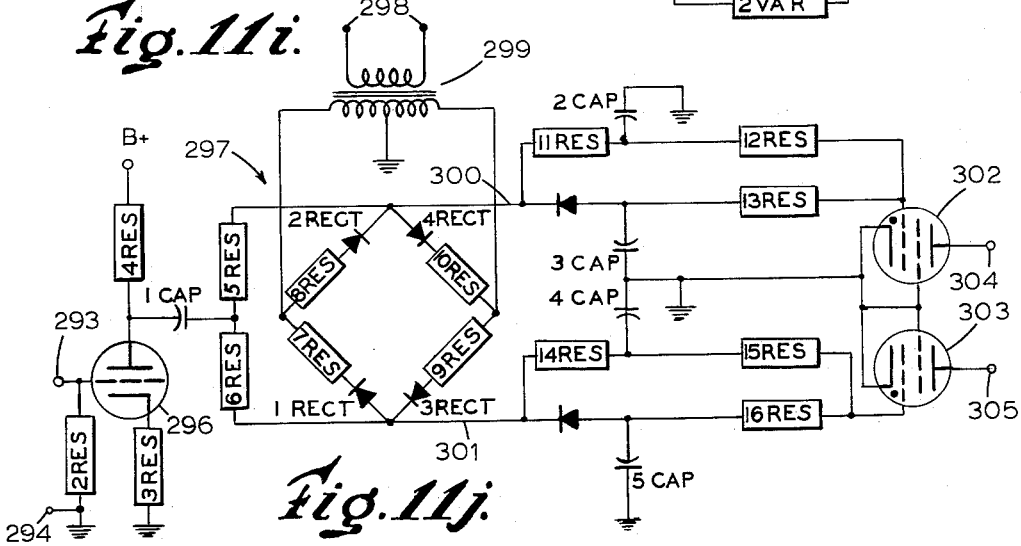

The energizing circuits for stepping switches 4205SS and 4208SS are shown in FIG. 11i. The energizing coils of the stepping switches are connected between a source 277 of D.C. voltage and a ground conductor 278 through a series of relay contacts including their own interrupter contacts, normally closed contacts of stopper relays 4203CR and 4206CR, normally opened contacts of relay 4527CR which is energized when the cam pin 135 is elevated, and normally open contacts of relays 4513CR and 4514CR. The relay 4513CR, which will hereinafter be described in greater detail, is energized when the No. 1 spindle is in the rear, or loading, position. Similarly, the relay 4514CR is energized when the No. 2 spindle is in the rear position. Hence, assuming that relay 4513CR is energized and that the cam pin is out of the notch, then stepping switch 4205SS will be stepped continuously so long as the stopper relay contacts 4203CR (177) remain closed. When the wipers 279 (FIG. 11h) of stepping switch banks 4205SS–A and –B reach a stud which is connected to ground through bank 4202SS–B in the decade selected by bank 4201SS–B, stopper relay 4203CR will be energized and prevent further stepping of the stepping switch. A similar operation will be effected in the case of stepping switch 4208SS when the No. 2 spindle is in the rear position thereby energizing relay 4514CR. Relays 4204CR and 4207CR are for the purpose of providing holding circuits around the contacts of relay 4527CR to insure energizing current for the stepping switches until the stopper relays are energized.

Referring now to FIG. 11g, sine and cosine analog voltages are provided for effecting positioning of the tool drum by a tapped autotransformer 280. The transformer is provided with end terminals 281 and 282 which are connected to an alternating current reference voltage source. The transformer is also provided with a center tap 283 and 8 additional taps on each side of the center tap. These taps provide angular intervals of ten degrees each and the number of turns between taps are so chosen as to provide voltage increments which are proportional to the sines and cosines of the angles represented by the taps. In the case of store No. 1, taps corresponding to the cosine of each of the 36 angular increments are connected to the studs of stepping switch banks 4205SS–E and –F. Similarly, taps corresponding to the sines of the angular increments are connected to 36 taps on stepping switch banks 4205SS–G and –H. It is to be noted that the center tap 283, which represents electrical 0, will correspond to the value of the sine for 0°, 180° and 360° and to the value of the cosine for 90° and 270°. Since there are 36 receptacles on the tool drum, each of the 36 positions of the wipers of the stepping switch banks will provide a sine and cosine voltage corresponding to an angular position of the drum in which a receptacle is located at the tool change position. Similar connections are made to the sine and cosine taps of transformer 280 from the studs of stepping switch banks 4208SS–E –F –G –H which are herein represented by blocks 284 and 285.

The sine and cosine voltages derived from the transformer 280 are connected to the quadrature windings 286 and 287, respectively, of the resolver 1R mounted within the hub of the tool drum. When spindle No. 1 is in the rear position, the relay 4513CR will be energized thereby connecting the sine and cosine voltages for store No. 1 to the windings 286 and 287. Alternatively, when spindle No. 2 is in the rear position, relay 4514CR will be energized and cause the sine and cosine voltages derived from store No. 2 to be applied to the windings 286 and 287. The common terminal of the windings 286 and 287 are connected by a wire 288 to the center tap 283 of the transformer.

With the spindle No. 1 in the rear position, it is also possible to connect the voltages from store No. 2 to the resolver windings. This is made possible by the contacts of a relay 4546CR shown in FIG. 11g. Thus, when the latter relay is energized, the analog voltages from store No. 1 will be disconnected from the resolver and the voltages from store No. 2 will be connected therewith. When the No. 2 spindle is in the rear position, energization of relay 4546CR will disconnect store No. 2 and connect store No. 1 to the resolver. This is for the purpose of permitting the drum to be repositioned at the end of a tool change cycle so as to be ready to receive the tool in the front spindle when the turret is next indexed.

The resolver 1R includes a rotor coil 292 which is connected to terminals 293 and 294 of a phase sensitive error amplifier 295. This unit is detailed in FIG. 11j and includes an amplifier tube 296 which amplifies the error signal from the resolver and transmits it to a phase sensitive rectifier 297 of conventional design. The rectifier is supplied with the same reference voltage which is connected across the autotransformer 280, this voltage being connected to terminals 298 of the primary winding of a transformer 299. The polarized D.C. voltage from the rectifier is delivered through conductors 300 and 301 to a filter balanced to ground after which it is applied to the grids of thyratron tubes 302 and 303. The plates of these tubes are connected to terminals 304 and 305 which are in turn connected through the operating coils of relays 5101CR and 5102CR (FIG. 11g) to a source of alternating current connected to terminals 306. With no signal present on the grids of the tubes 302 and 303, both will conduct and both relays will be energized. However, when a signal voltage is applied to the input of the phase sensitive amplifier 295, the grid of one of the tubes will be biased negative and cause this tube to be extinguished whereby one of the relays will be deenergized.

As mentioned earlier herein, the circuitry for controlling the sequencing of the different parts of the tool change mechanism is shown in FIGS. 11a to 11f, inclusive. These figures, taken in order, constitute a complete across-the-line wiring diagram of the tool change control circuits. For ease in locating the different relay coils and contacts as well as other components of the circuit, the lines have been numbered along the left hand margin of each sheet and these numbers will be referred to in the following description so as to provide a ready reference to the location of the parts being described. To further facilitate the location of the various relay contacts, there is provided along the right hand margin of each sheet and adjacent to each of the relays, a listing of the lines in which the contacts of that particular relay are located. Normally closed contacts are indicated by underscoring the line number.

The wiring diagram for the drawbar motors of the two spindles mounted in the turret is shown in FIG. 11a. These motors, 5MTR and 6MTR, are reversible, three-phase motors and are supplied from a three-phase source connected to terminals L1, L2 and L3. The energization of the motors and the direction of rotation thereof is controlled by relays 5MR, 5MF, 6MR and 6MF (see lines 21–24). The operating coils of these relays are connected across conductors 310 and 311 which are supplied with alternating current from a secondary winding of a transformer 312 after a master start push button 313 has been depressed.

When the No. 1 spindle is in the rear or loading position, a relay 4513CR will be energized thereby closing its contacts in line 21. At the appropriate time in the tool change cycle, a relay 4522CR will be energized to close its contacts in line 21 and energize relay 5MR which will operate the drawbar motor for spindle No. 1 in a direction to release the tool in the spindle. At a later point in the cycle, after the old tool has been removed from the spindle and a new one inserted, a relay 4530CR will be energized and close its contacts in line 22. This will energize relay 5MF and cause the drawbar motor 5MTR to be energized and rotated in a direction to tighten the tool in the spindle.

When spindle No. 2 is in the rear position, a relay 4514CR will be energized thereby closing its contacts in line 23 to condition the drawbar motor 6MTR for spindle No. 2 for operation under the control of relays 4522CR and 4530CR.

The control unit is also provided with an automatic cycle control relay 1020CR (25) which is controlled by a selector switch 314. In the "Automatic" position of the switch, the relay 1020CR is held energized. When the switch is turned to "Manual," the relay is deenergized.

In lines 27 and 41 of the diagram are shown the various valve operating solenoids heretofore discussed in connection with the hydraulic circuit together with the relay contacts which control their energization.

The control circuits for the high speed and low speed spindle clutches are shown in lines 43 to 50 inclusive. As there shown, when the No. 2 spindle is in the rear position, relay contacts 4514CR (43) will be closed and cause the coil 66 of the low speed clutch for spindle No. 1 to be energized from a D.C. voltage source connected to conductors 315 and 316 through the normally closed contacts of a relay 4306CR. The latter relay, while not shown in the present circuit, may be controlled in any desired manner to select the speed range of the front spindle and such control may be effected either manually or else from information contained on a tape or other type of record material. Thus, when the relay 4306CR is energized, the high speed clutch will be engaged to drive whichever spindle is in the forward position at high speed. When spindle No. 1 is in the rear position, the contacts of relay 4513CR in line 47 will be closed to provide a similar control for the clutches of spindle No. 2.

During indexing of the spindle turret it is desirable to lock one of the spindles against rotation so as to cause the splined shaft 34 (FIG. 1) to be rotated thereby rotating the gears in the change speed gear box located in the bed of the machine. This is for the purpose of facilitating the shifting of the gears in the gear box during indexing of the turret. For this purpose a relay 4540CR (57) is provided which has a pair of normally open contacts in line 44 and also in line 46 which cause both clutches of spindle No. 1 to be energized when the relay is picked up. This will effectively lock the spindle against rotation and cause the shaft 34 to be turned when the turret is indexed.

At an appropriate point in the tool change cycle, a relay 4520CR will be energized to cause indexing of the spindle turret. This is effected by the closing of contacts 4520CR in line 51 which causes either relay 4537CR (51) or relay 4538CR (53) to be energized. When the No. 2 spindle is in the rear position, the relay 4514CR will be energized thereby closing its contacts in line 51 and causing relay 4537CR to be energized. This will cause solenoid 13SOL to be activated thereby indexing the turret in clockwise direction. If, on the other hand, spindle No. 1 is in the rear position, the contacts 4513CR in line 53 will be closed thereby causing relay 4538CR and solenoid 14SOL to be energized so as to initiate counterclockwise indexing movement of the turret.

When the automatic cycle relay 1020CR is energized, or when a relay 4549CR (76) is energized during a load or unload cycle, the contacts of these relays in lines 52 and 53, respectively, will be closed thereby causing a conductor 317 to be connected to conductor 316. The conductor 317 provides a holding circuit for certain of the relays during the automatic tool change cycle.

At the outset of the tool change cycle, a relay 4517CR is energized to close its contacts in line 55 and open its contacts in line 62. Thereby a relay 4539CR (55) will be energized to activate a brake in the change speed gear box located in the bed of the machine. This will prevent rotation of the splined shaft 34 which drives the spindles. At the same time a relay 4542CR (61) will be deenergized thereby releasing the clutch in the gear box to further deactivate the spindles. At a subsequent point in the automatic tool change cycle, a relay 4519CR will be energized and close its contacts in line 57 thereby picking up the relay 4540CR so as to lock the high and low speed clutches of spindle No. 1 as previously described. At this time the normally closed contacts of relay 4519CR in line 56 will open and release the brake in the gear box. At still a later point in the cycle, a relay 4521CR (143) will be energized and close its contacts in line 61 thereby engaging the gear box clutch and reinstating the drive to the spindles through the splined shaft 34.

Since the operations of the tool change mechanism follow a well defined sequence, a stepping switch 4534SS (78) is used to direct the machine through the tool change cycle. One bank of the stepping switch is utilized to control the operations at different times during the sequence and another bank feeds back to the stepping switch coil a signal indicating that the required operations have been performed and that the switch should advance to the next stud. The control bank is shown in FIGS. 11e and 11f and is designated as bank 3534SS–B while the feedback bank is shown in FIGS. 11c and 11d and is designated as bank 3534SS–C. Two additional feedback banks denoted by subscripts D and E in FIG. 11c are utilized to provide special load and unload cycles of the mechanism. The stepping switch has interrupter contacts in line 81 which activate an interrupter relay 4535CR which has a pair of normally closed contacts in line 78. When the interrupter relay is energized, these contacts will open and deenergize the stepping switch 3534SS. The interrupter relay 4535CR also has a pair of normally closed contacts in line 136 which open and deenergize wiper 318 of stepping switch bank 4534SS–B when the interrupter relay is energized. Thus, the wiper 318 will carry current only when it is stationary thereby prolonging the life of the wiper and the studs engaged thereby.

Also, it is necessary for the stepping switch to be positioned at the home or zero position before starting the tool change sequence. This is accomplished automatically during normal operation but if, for any reason, the switch should be left at an intermediate position it may be restored or returned to home by depressing a reset button 319 (78) with the selector switch 314 set to the manual position. The reset button, when depressed, will complete a circuit to the stepping switch coil through the off normal contacts of the stepping switch in line 78 and cause the switch to step to its home position at which time the off normal contacts will open and stop further stepping of the switch.

To initiate a tool change cycle, a tool change push button 320 in line 67 is depressed thereby energizing the tool change relay 4548CR which is held energized through its own contacts in line 69 and the off normal contacts of the stepping switch. Assuming the selector switch 314 to be set for automatic operation, as it should be for an automatic tool change cycle, the relay 1020CR will be energized thereby closing its contacts in line 79. Therefore, when tool change relay 4548CR is energized and closes its contacts in line 80, a circuit will be established to the operating coil of the stepping switch through the off normal contacts thereof in line 80. This will operate the armature of the stepping switch and close the interrupter contacts thereof in line 81 which will energize interrupter relay 4535CR and break the circuit to the stepping switch. This will release the armature of the switch and cause the wipers to advance to position 1. In this position, the off normal contacts of the stepping switch in line 69 will open and release tool change relay 4548CR.

With the stepping switch in position 1, a relay 4517CR (137) is energized and sets up the starting conditions for the automatic cycle. Thus, it releases relay 4542CR (61) to disengage the gear box clutch, it operates relay 4539CR (55) to actuate the gear box brake, it operates relays 4526CR (153) and relay 4531CR (167) to energize solenoids 8SOL and 5SOL to hold the change arm down, and it also energizes relay 4525CR (150) to move the change arm slide to its "In" position.

When the necessary starting conditions have been fulfilled, the stepping switch will be stepped to position 2. Thus, when limit switch 12LS (FIG. 1) is actuated by movement of the cross-slide 24 to the datum position either manually or by programmed information on the controlled tape, relay 4512CR (126) will be energized and close its contacts in line 86. Similarly, with the spindle turret located in either of its positions, limit switch 13LS or 14LS will be actuated so as to energize relay 4513CR (127) or relay 4514CR (129) and close the contacts of these relays in lines 86 or 87. When the tool drum cam pin is seated in the notch in the cam 133, limit switch 2LS will be actuated and energize relay 4502CR (117) which will close its contacts in line 86. The changer arm having been moved to its "Down" position will cause limit switch 5LS to be operated thereby energizing relay 4505CR (120) and causing its contacts in line 86 to be closed. Since the change arm slide is now in its "In" position, limit switch 10LS will be actuated so as to energize relay 4510CR (124) thereby closing the contacts of this relay in line 86. Hence the wiper 321 of stepping switch bank 4534SS–C, which is now resting on stud No. 1, will be connected to the ground conductor 316. This will cause the operating coil 4534SS to be energized and the switch will step to position 2.

Assuming that the tool head 16 has been raised to the datum position by information programmed on the control tape, the limit switch 11LS (FIG. 1) will be actuated and cause relay 4511CR (125) to be energized. Thereby, the contacts of this relay in line 88 will be closed as will also the contacts of relay 4512CR whereby the stepping switch will be advanced to position 3.

When wiper 318 (136) moves onto stud No. 3, a timer relay 1TR (139) will be energized and close its instantaneous contacts in line 59. This will energize relay 4541CR and activate solenoid 12SOL. Thereby, the turret clamps will be released and, after a time interval determined by the setting of timer contacts 1TR in line 89, stud No. 3 of the feedback bank will be connected to ground conductor 316 and energize the stepping switch which will advance to position No. 4.

Movement of wiper 318 onto stud No. 4 will energize relay 4519CR so as to release the brake control relay 4539CR (55) and pick up relay 4540CR (57) to energize the high and low speed clutches of spindle No. 1. When relay 4540CR is energized, it closes its contacts in line 90 thereby stepping the switch 4534SS to position 5.

In position 5, relay 4520CR (141) is energized and closes its contacts in line 51. Hence, either relay 4537CR or 4538CR will be energized and cause indexing of the turret. The holding circuits for relays 4537CR and 4538CR, together with the electrical interlock provided by the normally closed contacts of these relays in lines 51 and 53, prevent immediate reversal of the turret when it reaches the new position. Relay 4520CR also operates solenoid 4SOL (30) to increase the pressure and volume of fluid to the hydraulic index motor 1MF and also energizes solenoid 29SOL (41) to bypass the throttle valve in the return line from the index motor. When the turret reaches the new position, either contacts 4513CR and 4537CR in line 91, or the contacts 4514CR and 4538CR in line 92, will be closed and advance the stepping switch to position 6.

In position 6, timer relay 2TR (142) will be energized and its contacts in line 60 will time open and release relay 4541CR (59) so as to deenergize solenoid 12SOL and clamp the turret. After a predetermined interval, the contacts 2TR in line 93 will time closed and advance the stepping switch to position 7.

In position 7, relay 4521CR (143) is energized and closes its contacts in line 154 whereby relay 4526CR is also energized. The two relays cause solenoids 6SOL and 8SOL to be energized thereby elevating the tool change arm to its "Center" position where it engages the tool in the rear spindle. Relay 4521CR also opens its contacts in line 58 and drops out relay 4540CR thereby deenergizing the high and low speed clutches. When the change arm moves to its "Center" position, it operates the limit switch 6LS and picks up relay 4506CR (121) which closes its contacts in line 65. If spindle No. 1 is in the rear position, relay 4513CR will be energized and close its contacts in line 65 thereby energizing relay 4544CR. The contacts of this relay in line 31 will thereby close and activate solenoid 25SOL which operates the spindle lock for spindle No. 1. If spindle No. 2 is in the rear position, the solenoid 26SOL will be energized and engage the lock of the No. 2 spindle in preparation for draw bar release. Closure of contacts 4506CR in line 94 will advance the stepping switch to position 8.

In position 8, relay 4522CR (144) is energized and closes its contacts in lines 21 and 23. Thereby, the draw bar motor for the rear spindle will be operated to release the draw bar and, when this has been accomplished, relay 4501CR (116) or relay 4504CR (119) will be energized and close its contacts in lines 95 or 96 thereby advancing the stepping switch to the next position.

In position 9, relay 4523CR (146) will be energized and operate solenoid 9SOL which shifts the detented plunger of valve 271 (FIG. 10a) and causes the change arm slide to move to its "Out" position. This will remove the tool from the rear spindle and, as the tool leaves the spindle, the air valve 198 (FIG. 10b) will be operated and cause the fingers to grip the tool securely. When the slide reaches the "Out" position, relay 4509CR will be energized and close its contacts in line 97 thereby advancing the stepping switch to the next position.

In position 10, the relay 4524CR (148) is energized thereby activating solenoid 7SOL which shifts the plunger of valve 270 (FIG. 10a) to the right. Since valve 269 was last operated by solenoid SOL6, the tool change arm will be swung to its "Up" position where the tool is aligned with the receptacle in the tool drum. In this position of the arm, limit switch 7LS is actuated thereby energizing relay 4507CR (122) which closes its contacts in line 98 and advances the stepping switch to the next position.

In position 11, the relay 4525CR (150) will be energized since the arm is now up and the slide is out. Relay 4525CR energizes solenoid 10SOL (36) to move the change arm slide to the "In" position thereby inserting the tool in the receptacle in the drum. As the tool moves into the receptacle, the cam 200 (FIG. 5) operates the plunger 199 of the air valve 198 and releases the gripping fingers from the tool. When the slide is all the way in, limit switch 10LS is operated and energizes relay 4510CR (124). At this time, a build up of pressure in the cylinder line 215 causes pressure switch PS8 (FIG. 10b) to be operated thereby energizing relay 4516CR (132). Closure of contacts of relays 4510CR and 4516CR in line 99 advances the stepping switch to the next position.

In position 12, relay 4526CR (153) is energized and operates solenoid 8SOL which swings the empty change arm down to its "Center" position. In this position of the arm, relay 4506CR (121) is energized and closes its contacts in line 94. This provides a connection from stud No. 12 to ground conductor 316 through a conductor 327 and causes the stepping switch to advance to the next position.

In position 13 a relay 4527CR is energized so as to activate solenoid 3SOL (29) and thereby withdraw the cam pin 135. When the pin is withdrawn, and relay 4503CR (118) is operated, the contacts of this relay in line 101 are closed and the stepping switch is advanced to the next position. It is to be noted that relay 4527CR remains energized through its holding contacts in line 156 and the normally closed contacts of relay 4515CR. With these contacts closed, the relay is energized from a conductor 333 which is connected to ground conductor 316 through the contacts 4536CR (135) and 1020CR (133). Also, as shown in FIG. 11i, relay 4527CR causes the appropriate store to be filled with the information set up on switches 4201SS–B and 4202SS–B (FIG. 11h) thereby determining the tool to be brought into position for removal from the drum.

In position 14, either relay 4528CR or 4529CR (157 or 159) will be energized depending upon which of the coincidence relays 5101CR or 5102CR (FIG. 11g) is energized. These relays are in turn controlled by the resolver 1R which will thereby signal either clockwise or counterclockwise rotation of the drum whichever provides the shorter path to bring the selected receptacle to the tool change position. When the signal from the resolver becomes sufficiently small for both relays 5101CR and 5102CR to become energized, a relay 4515CR (131) is picked up thereby releasing relay 4527 CR (155). This deenergizes solenoid 3SOL and permits the cam pin 135 to move down onto the surface of the cam. Relay 4515CR also closes its contacts in line 102 and advances the stepping switch to the next position. Relay 4528 or 4529CR remains energized through the normally closed contacts of relay 4502CR in line 158 until the cam pin seats in the notch.

In position 15 the drum continues to rotate with the cam pin on the sloping portion 262 of the cam so that the decelerating valve 259 gradually reduces the speed of the drum. When the selected receptacle is in tool changing position, the pin drops into the notch and relay 4502CR is energized and releases relay 4528CR or 4529CR thereby short circuiting the hydraulic motor 3MF. At the same time, the relay 4502CR will close its contacts in line 103 and advance the stepping switch to the next position.

When the wiper 318 moves onto stud number 16 (159) it will be connected through the now closed contacts of relays 4502CR and 4506CR with a conductor 322 and will energize relay 4524 (148). This activates solenoid 7SOL and swings the empty change arm to its "Up" position where it engages the tool in the tool drum. When the arm is in the "Up" position, limit switch 7LS will be operated and energize relay 4507 CR (122). Thereby the contacts 4507CR in line 98 will be closed and stud No. 16 of the feedback bank will be connected by a conductor 323 with the ground conductor 316 so as to advance the stepping switch to the next position.

In position 17, inasmuch as the change arm slide is now in its "In" position, the relay contacts in line 161 will all be closed and a connection will be established from stud 17 through a conductor 324 to the relay 4523CR (146). Energization of the relay activates the solenoid 9SOL which moves the change arm slide to its "Out" position. As the slide moves out, the cam 200 will operate the air valve 198 and cause the fingers to close firmly upon the tool. When the slide is fully out, limit switch 9LS will be operated and energize relay 4509CR (123). This relay will close its contacts in line 97 thereby grounding stud No. 17 in the feedback bank through a conductor 325 and advance the stepping switch to the next position.

In position 18, relay 4526CR (153) will be energized through the closed contacts of relays 4507CR and 4509CR in line 162 and a conductor 326. This relay, when energized, operates solenoid 8SOL to swing the change arm to its "Center" position. In this position of the arm, relay 4506CR (121) will be energized thereby closing its contacts in line 94 and grounding stud No. 18 of the feedback bank through a conductor 327. Hence, the stepping switch will be advanced to the next position.

In position 19, relay 4525CR (150) will be energized from stud No. 19 through the closed contacts of relays 4506CR and 4509CR in line 163 and a conductor 328. Relay 4525CR operates solenoid 10SOL to move the change arm slide in and insert the tool into the rear spindle. In order for the tool to be fully engaged with the driving teeth on the spindle nose, it must engage them for a substantial distance before it is fully seated in the spindle. In the event that the teeth should strike on top of the corresponding teeth on the spindle nose and stop the movement on the tool change arm slide before it is fully seated, pressure will build up in the cylinder line 215 and operate pressure switch PS8 thereby energizing relay 4516CR (132). Since limit switch 8LS is held operated by the pad 211 (FIG. 5) at this time relay 4543CR (63) will be energized to open its contacts in line 163 and close its contacts in line 145. Thereby relay 4525CR (50) will be deenergized and relay 4523CR (46) will be energized. Accordingly, solenoid 9SOL will be operated and move the change arm slide out until limit switch 8LS is released. This will drop out relay 4543CR and it in turn releases relay 4523CR and picks up relay 4525CR which operates solenoid 10SOL and again moves the slide in. This action may be repeated indefinitely until the teeth mesh and the tool becomes fully seated whereupon relay 4510CR (124) is energized. Also, pressure switch PS8 will close and energize relay 4516CR (132). Thereby, the contacts of these relays in line 99 will be closed and ground stud 19 of the feedback bank through a conductor 329 thereby advancing the stepping switch to the next position.

In position 20, insertion of the tool holder in the spindle pushes back the draw bolt and operates limit switch 1LS or 4LS thereby energizing relay 4501CR or 4504CR. Thereby, the contacts of these relays in line 165 or 166 will be closed as will also the series connected contacts of relay 4513CR or 4514CR to establish a circuit through the now closed contacts of relays 4510CR and 4516CR to the time relay 3TR. A relay 4530CR will also be energized through the delayed opening contacts of timer relay 3TR. Thereby, the contacts of relay 4530CR in lines 22 and 24 will be closed and the appropriate draw bar motor will be operated in a forward direction to tighten the tool holder in the spindle. The timer contacts of relay 3TR in line 164 are so adjusted as not to open until the draw bar has had sufficient time to tighten the tool holder in the spindle. After the draw bar is tight, the relay 4501CR or 4504CR will be deenergized and close its contacts in line 108 or 109. After a suitable time delay, the delayed closing contacts 3TR in line 108 will time closed and advance the stepping switch to the next position. The timer relay 3TR will be held energized through its instantaneous contacts and the normally closed contacts of relay 4505CR in line 164.

In position 21 relay 4531 (167) is energized and operates solenoid 5SOL to swing the change arm to the "Down" position. When the arm is in this position, limit switch 5LS is operated and energizes relay 4505CR (120). Accordingly, the contacts of this relay in line 164 will open and deenergize timer relay 3TR and contacts 4505CR in line 110 will close and advance the stepping switch to the next position.

In position 22 relay 4527CR (155) will be energized through the now closed contacts of relay 4505CR in line 170 and a conductor 330. Relay 4527CR operates solenoid 3SOL to thereby remove the cam pin 135 from the notch in cam 133. When the cam is raised, it operates limit switch 3LS which in turn energizes relay 4503CR (118) thereby closing the contacts of this relay in line 101. Thereby stud 22 of the feedback bank is connected to the ground conductor 316 through a conductor 331. Relay 4527CR is held energized by the normally closed contacts of relay 4515CR in line 156.

In position 23 a relay 4546CR is energized and held in by its contacts in line 169 which are connected through a conductor 332 with conductor 333 through the normally closed contacts of relay 4502CR in line 158. As mentioned earlier herein, conductor 333 is connected with the ground conductor 316 by the normally closed contacts of relay 4536CR in line 135 and the contacts of either relay 1020CR or 4549CR in line 133 or 134. The relay 4546CR, when energized, connects the resolver 1R to the store containing the tool drum location for the tool in the front spindle. When relay 4546CR is energized, its contacts in line 112 will be closed thereby advancing the stepping switch to the next position.

In position 24 either relay 4528CR or 4529CR will be energized through the now closed contacts of relay 4503CR in line 172. As before, the drum will be rotated through the shortest path to bring the receptacle associated with the tool in the front spindle into tool changing position. As the drum approaches coincidence, relay 4515CR (131) will be energized and release relay 4527CR (155) to lower the cam pin 135 and decelerate the tool drum. When the selected receptacle reaches the tool change position, the cam pin will enter the notch and cause relay 4502CR to be energized thereby opening its contacts in line 158 and releasing either relay 4528CR or 4529CR to short circuit the hydraulic motor 3MF. Opening of contacts 4502CR in line 158 also releases relay 4546CR and the stepping switch is advanced to the next position by the closing of contacts 4502CR in line 113.

In position 25 a relay 4552CR (172) is energized thereby closing its contacts in line 115 which advances the stepping switch to its home position ready for the next operation.

When the machine is being set up for the first time for a particular machining operation, all of the tools will be in the drum and the spindles will be empty. When it is desired to load the first tool into the spindle, the identifying number of the receptacle containing the selected tool is set into the control by means of switches 4201SS–B and 4202SS–B (FIG. 11h), the selector switch 314 is set to "Manual," and the load button 334 (73) is depressed. This will cause relay 4532CR (72) to be energized through the normally closed contacts of the automatic cycle relay 1020CR. Relay 4532CR will be held energized through its holding contacts in line 72 and through the normally closed contacts of relays 4552CR and 4533CR in the same line. When relay 4532CR is picked up, its contacts in line 76 will be closed and energize relay 4549CR and its contacts in line 70 will be closed and energize the tool change relay 4548CR. Thereby, the contacts of relay 4548CR in line 80 will be closed and cause the stepping switch to be advanced through the contacts 4549CR in line 79 which are now closed. When the stepping switch steps to position 1, the tool change relay 4548CR will be deenergized by the opening of the off normal contacts of the stepping switch in line 69.

Since the contacts of relay 4532CR in line 83 will now be closed, the stepping switch bank 4533SS–D will be activated and will energize a relay 4536CR (82) whenever the wiper 335 of this bank is grounded. When relay 4536CR is energized it will close its contacts in line 82 and energize the operating coil of the stepping switch which will thereafter be interrupted through the operation of the interrupter relay 4535CR in the usual manner. It is to be noted that the bank 4534SS–C of the stepping switch will remain active and control the sequencing of the tool change mechanism as previously described until position 7 is reached when bank 3534SS–D will take control and cause positions 7 through 11 to be skipped. This is effected by strapping the studs 7 through 11, inclusive, of this bank to ground through a conductor 336. These five positions are the ones which effect unloading of the old tool from the spindle and placing it in its receptacle in the tool drum. This is, of course, unnecessary in the present instance since there is no tool in the spindle to be removed. The machine will continue to operate through positions 12 to 25 under the control of the normal feedback bank 3534SS–C and in position 25 relay 4552CR (172) will be energized and open its contacts in line 72 to deenergize the load relay 4532CR. The contacts 4552CR in line 115 will also be closed at this time to step the stepping switch to home position ready for the next cycle. The second spindle may be loaded in the same manner, that is, by entering the number of the receptacle containing the tool to be loaded into the second spindle by switches 4201SS–B and 4202SS–B (FIG. 11h) after which the load push button 334 is depressed to initiate the loading cycle.

At the conclusion of a machining operation when it is desired to unload the spindles and return the tools to the tool drum, an unload push button 337 (74) is depressed to energize a relay 4533CR which energizes relay 4549CR by its contacts in line 77 and also energizes tool change relay 4548CR by its contacts in line 68. Thereby, the stepping switch is advanced to position 1 and bank 3534SS–E of the stepping switch is activated by means of the contacts 4533CR in line 83. As in the case of the loading cycle, the normal feedback bank 4534SS–C will control the sequencing of the mechanism through all positions except 13 to 20, inclusive, which will be skipped under control of bank 4534SS–E. This is effected by strapping together the studs 13 to 20 of this bank and connecting them to ground through the conductor 336. These 8 positions are those which control the loading of the new tool into the rear spindle which, of course, is unnecessary for a spindle unloading operation. Hence, when wiper 338 of the bank 4534SS–E reaches stud No. 13, relay 4536CR will be energized and close its contacts in line 82 and cause continued stepping of the stepping switch until position 21 is reached where the normal feedback bank will again assume control and continue through the rest of the cycle in the normal manner. Again, in position 25, relay 4552CR (172) will be energized and open its contacts in line 75 to thereby deenergize the unload relay 4533CR. Also, the contacts 4552CR in line 115 will be closed to cause the stepping switch to advance to home position ready for the next operation.

While one particular embodiment of the invention has been disclosed in the foregoing specification, it is to be understood that the invention is capable of being carried out in a variety of ways. Changes, therefore, may be made in the construction and arrangement of my new form of tool changing apparatus without departing from the scope of the invention as expressed in the appended claims which are intended to encompass the patentable novelty inherent in the invention as broadly as possible in view of the prior art.

What is claimed is:

1. A machine tool for automatically performing a series of successive machining operations with different cutting tools comprising a tool head, a turret rotatably supported on said tool head, a pair of spindles journaled for rotation in said turret with their axes disposed in spaced, parallel relation and normal to the axis of rotation of said turret but offset by equal amounts on opposite sides thereof, power draw bar means associated with the rear end of each of said spindles for securing a cutting tool in the forward end thereof, means for indexing said turret on said head to move one spindle thereon from an operating station to a tool change station and the other spindle thereon from the tool change station to the operating station, a tool drum supported for rotation on said tool head, a plurality of receptacles distributed around the periphery of the drum for holding the different cutting tools, selection means for rotating the drum to bring a selected receptacle into a tool change position, means to transfer a cutting tool from the spindle at the tool change station to its receptacle in said tool drum and vice versa, and means for controlling the operation of said selection means and said transfer means to cause the old tool carried by the spindle at the tool change station to be returned to said tool drum and replaced with a new tool therefrom while a machining operation is being performed by the tool in the spindle at the operating station.

2. A machine tool for automatically performing a series of successive machining operations for different cutting tools comprising a tool head, a turret rotatably supported on said tool head, a pair of spindles journaled for rotation in said turret with their axes disposed in spaced, parallel relation and normal to the axis of rotation of said turret but offset by equal amounts on opposite sides thereof, power draw bar means associated with the rear end of each of said spindles for securing a cutting tool in the forward end thereof, means for indexing said turret on said head to move one spindle thereon from an operating station to a tool change station and the other spindle thereon from the tool change station to the operating station, tool storage means moving with said tool head and having a plurality of receptacles for holding the different cutting tools, means to select a particular receptacle for use during a tool change operation, means including a tool change arm supported on said tool head for both rotary and translational movements for removing a cutting from the spindle at the tool change station and transferring it to its receptacle in said storage means and vice versa, and means for controlling the operation of said selection means and said transfer means to cause the old tool carried by the spindle at the tool change station to be returned to said storage means and replaced with a new tool therefrom while a machining operation is being performed by the tool in the spindle at the operating station.

3. A machine tool for automatically performing a series of successive machining operations with different cutting tools comprising a tool head, a turret rotatably supported on said tool head, a pair of spindles journaled for rotation in said turret with their axes disposed in spaced, parallel relation and normal to the axis of rotation of said turret but offset by equal amounts on opposite sides thereof, power draw bar means associated with the rear end of each of said spindles for securing a cutting tool in the forward end thereof, means for indexing said turret on said head to move one spindle thereon from an operating station to a tool change station and the other spindle thereon from the tool change station to the operating station, a tool drum supported for rotation on the rear portion of said tool head, a plurality of receptacles distributed around the periphery of the drum for holding the different cutting tools, selection means for rotating the drum to bring a selected receptacle into a tool change position, means including a pivoted tool change arm for transferring a cutting tool from the spindle at the tool change station to its receptacle in said tool drum and vice versa, and means for controlling the operation of said selection means and said transfer means to cause the old tool carried by the spindle at the tool change station to be returned to said tool drum and replaced with a new tool therefrom while a machining operation is being performed by the tool in the spindle at the operating station.

4. A machine tool for automatically performing a series of successive machining operations with different cutting tools comprising a tool head, a turret rotatably supported on said tool head, a pair of spindles carried by said turret each of which is adapted to receive and hold a cutting tool, means for indexing said turret on said head to move one spindle thereon from an operating station to a tool change station and the other spindle thereon from the tool change station to the operating station, tool storage means having a plurality of receptacles for holding the different cutting tools, means to select a particular receptacle for use during a tool change operation, means for transferring a cutting tool from the spindle at the tool change station to said storage means and vice versa, said means including a slide mounted on said tool head for in and out movement in a direction parallel to the axis of rotation of the spindle at the tool change station, a tool change arm pivoted on said slide for rotation about an axis parallel to the axis of the last-named spindle, means on said arm for gripping a tool located in a receptacle in said storage means to enable the tool to be removed from the receptacle upon outward movement of said slide and to be inserted in the last-mentioned spindle upon inward movement of said slide after the arm has been turned to bring the tool into alignment with the spindle means operated in response to the in and out movement of said slide for causing said gripping means to seize the tool and secure it to said arm as the tool is removed from the receptacle in said storage means, and means for controlling the operation of said selection means and said transfer means to cause the old tool carried by the spindle at the tool change station to be returned to said storage means and replaced with a new tool therefrom while a machining operation is being performed by the tool in the spindle at the operating station.

5. A machine tool for automatically performing a series of successive machining operations with different cutting tools comprising a tool head, a spindle in said tool head adapted to receive and hold a cutting tool, storage means having a plurality of receptacles for holding the different cutting tools in closely spaced, parallel relation, means for removing a selected cutting tool from said storage means and inserting it in the spindle, said means including a slide mounted on said tool head for in and out movement in a direction parallel to the axis of the spindle, a tool change arm supported on said slide for rotation about an axis parallel to the axis of the spindle, a pair of elongated gripping fingers mounted on said arm and projecting outwardly therefrom in a direction normal to a line connecting the center of rotation of the arm with the center of the selected tool in the storage means when the fingers are engaged with the tool, and means operated in response to the in and out movement of said slide for causing the gripping fingers to seize the tool and secure it to the arm as the selected tool is removed from its receptacle in the storage means upon outward movement of said slide.

6. A machine tool for automatically performing a series of successive machining operations with different cutting tools comprising a tool head, a turret rotatably supported on said tool head, a pair of spindles with their axes disposed in spaced, parallel relation and normal to the axis of rotation of the turret but offset by equal amounts on opposite sides thereof, power means for driving said spindles including selectively engageable backgears on said spindle, means for indexing said turret on said head to move one spindle thereon from an operating station to a tool change station and the other spindle thereon from the tool change station to the operating station, storage means having a plurality of receptacles for holding the different cutting tools to be used in said series of successive machining operations in adjacent relationship, and means for removing a selected tool from said storage means and inserting it in the spindle including a tool change arm supported for rotation about an axis parallel to the axis of said spindle, and gripping fingers mounted on said arm and projecting outwardly therefrom, whereby said fingers are enabled to enter the spaces between adjacent tools in the storage means and seize the selected tool between the fingers for removal therefrom.

7. A machine tool for automatically performing a series of successive machining operations with different cutting tools comprising a base having front and rear portions thereon, a work support mounted on the front portion of said base for translatory movements with respect thereto, an upstanding column mounted on the rear portion of said base, a tool head supported for vertical sliding movement on the side of said column, a turret supported on said tool head for rotation about a horizontal axis, a pair of oppositely disposed spindles journaled for rotation in said turret about spaced, parallel axes, said axes being perpendicular to the axis of rotation of said turret, each of said spindles having a spindle nose adapted to receive and hold a cutting tool, means to index said turret 180° on said head to move the spindle nose of one spindle from a forward operating station to a rearward tool change station and to simultaneously move the spindle nose of the other spindle from the rearward tool change station to the forward operating station, a tool storage drum supported on the rear of the tool head for rotation about an axis parallel to the axes of the spindles, a plurality of receptacles on the periphery of said drum for holding the cutting tools with their longitudinal axes parallel to the axis of rotation of the drum, means for transferring a cutting tool from the spindle at the tool change station to the storage drum and vice versa, said means including a slide mounted on said tool head for in and out movement in a direction parallel to the axis of the spindle located at the tool change station, a tool change arm pivoted at one end on said slide for rotation about an axis parallel to the axis of said tool drum, means to select a particular receptacle for cooperation with said tool change arm during a tool change operation, means on the other end of said tool change arm for gripping a tool and removing it from the receptacle upon outward movement of said slide and thereafter inserting it in the spindle upon inward movement of said slide after the arm has been turned to bring the tool into alignment with the spindle, and means for controlling the operation of said selection means and said transfer means to cause the old tool carried by the spindle at the tool change station to be returned to said storage means and replaced with a new tool therefrom while a machining operation is being performed by the tool in the spindle at the operating station.

References Cited by the Examiner

UNITED STATES PATENTS 3,186,085  6/1965  Coate _____ 29—568

OTHER REFERENCES

Control Engineering, December 1960, pp. 125 to 127.

Hughes M.T.–3 Machining Center, a sales brochure, illustrating the above cited publication.

RICHARD H. EANES, JR., *Primary Examiner.*